(12) United States Patent
Ross et al.

(10) Patent No.: US 11,062,337 B1
(45) Date of Patent: Jul. 13, 2021

(54) NEXT PRODUCT PURCHASE AND LAPSE PREDICTING TOOL

(71) Applicant: MASSACHUSETTS MUTUAL LIFE INSURANCE COMPANY, Springfield, MA (US)

(72) Inventors: Gareth Ross, Amherst, MA (US); John Karlen, Springfield, MA (US); Asieh Ahani, Springfield, MA (US); Xiangdong Gu, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 125 days.

(21) Appl. No.: 16/036,837

(22) Filed: Jul. 16, 2018

Related U.S. Application Data

(63) Continuation-in-part of application No. 14/577,402, filed on Dec. 19, 2014, now Pat. No. 10,096,068.
(Continued)

(51) Int. Cl.
*G06Q 30/02* (2012.01)
*G06K 9/62* (2006.01)
(Continued)

(52) U.S. Cl.
CPC ....... *G06Q 30/0206* (2013.01); *G06K 9/6256* (2013.01); *G06N 7/00* (2013.01);
(Continued)

(58) Field of Classification Search
CPC ........... G06Q 30/0206; G06Q 30/0202; G06Q 30/02; G06Q 30/00; G06Q 30/01;
(Continued)

(56) References Cited

U.S. PATENT DOCUMENTS

| | | |
|---|---|---|
| 5,519,773 A | 5/1996 | Dumas et al. |
| 6,334,110 B1 | 12/2001 | Walter et al. |

(Continued)

FOREIGN PATENT DOCUMENTS

| | | |
|---|---|---|
| EP | 2109302 B1 | 9/2010 |
| WO | 2009065052 A1 | 5/2009 |

OTHER PUBLICATIONS http://www.computer.org/csdl/proceedings/hicss/2001/0981/07/09817023.pdf Dawn Jutla; Enabling and Measuring Electronic Customer Relationship Management Readiness; Proceedings of the 34th Hawaii International Conference on System Sciences—2001; Aug. 7, 2002; 10 pages.
(Continued)

*Primary Examiner* — Scott S Trotter
*Assistant Examiner* — Divesh Patel
(74) *Attorney, Agent, or Firm* — Foley & Lardner LLP

(57) ABSTRACT

A processor-based system and method retrieve customer purchase history information from an internal customer purchase history database for a plurality of customer records representing customers that previously purchased products of an enterprise, and retrieve customer profile information for each customer record. The processor executes a predictive machine learning model to determine a set of product purchase scores for each of the customers by applying a logistic regression model utilizing gradient boosting to the customer purchase history information and the customer profile information. The processor classifies the customers into a target customer group and a non-target customer group by applying a classification criterion to the set of product purchase scores, and generates a report of customers in the target customer group including highest product purchase scores and products recommended for cross-sale. In some embodiments, the predictive machine learning
(Continued)

model is configured to forecast likelihood that given customers will lapse in payment.

20 Claims, 11 Drawing Sheets

Related U.S. Application Data

(60) Provisional application No. 61/920,134, filed on Dec. 23, 2013.

(51) Int. Cl.
*G06N 7/00* (2006.01)
*G06Q 30/00* (2012.01)
*G06N 20/00* (2019.01)

(52) U.S. Cl.
CPC .............. *G06N 20/00* (2019.01); *G06Q 30/01* (2013.01); *G06Q 30/0201* (2013.01)

(58) Field of Classification Search
CPC ...... G06Q 30/0201; G06N 20/00; G06N 7/00; G06K 9/6256; G06K 9/6217; G06K 9/62; G06K 9/00
See application file for complete search history.

(56) References Cited

U.S. PATENT DOCUMENTS

| | | | |
|---|---|---|---|
| 6,389,400 B1 | 5/2002 | Bushey et al. | |
| 6,519,571 B1 | 2/2003 | Guheen et al. | |
| 6,879,683 B1 | 4/2005 | Fain et al. | |
| 6,959,080 B2 | 10/2005 | Dezonno et al. | |
| 7,023,979 B1 | 4/2006 | Wu et al. | |
| 7,035,811 B2 | 4/2006 | Gorenstein | |
| 7,155,401 B1* | 12/2006 | Cragun | G06Q 30/02 705/7.31 |
| 7,184,540 B2 | 2/2007 | Dezonno et al. | |
| 7,539,627 B2 | 5/2009 | Schmidt | |
| 8,054,964 B2 | 11/2011 | Flockhart et al. | |
| 8,126,712 B2 | 2/2012 | Mukaigaito et al. | |
| 8,296,160 B1 | 10/2012 | Pletz et al. | |
| 8,341,665 B2 | 12/2012 | Atsmon et al. | |
| 8,355,934 B2 | 1/2013 | Virdhagriswaran | |
| 8,687,776 B1 | 4/2014 | Reynolds et al. | |
| 8,737,595 B2 | 5/2014 | Chishti et al. | |
| 8,799,096 B1* | 8/2014 | Dillon | G06Q 30/02 705/26.1 |
| 8,929,537 B2 | 1/2015 | Chishti et al. | |
| 9,008,283 B2 | 4/2015 | Riahi et al. | |
| 9,020,866 B1* | 4/2015 | Zhou | G06N 20/20 706/13 |
| 9,083,804 B2 | 7/2015 | Conway et al. | |
| 9,208,502 B2 | 12/2015 | Parikh et al. | |
| 9,215,323 B2 | 12/2015 | Chishti | |
| 9,582,786 B2 | 2/2017 | Gubin et al. | |
| 9,779,445 B1 | 10/2017 | Hoberman et al. | |
| 9,911,161 B1 | 3/2018 | Ross et al. | |
| 2002/0198882 A1 | 12/2002 | Linden et al. | |
| 2004/0081311 A1 | 4/2004 | Thompson | |
| 2005/0195966 A1 | 9/2005 | Adar et al. | |
| 2006/0062374 A1 | 3/2006 | Gupta | |
| 2007/0136164 A1 | 6/2007 | Roti et al. | |
| 2007/0219867 A1* | 9/2007 | Mehm | G06Q 30/02 705/14.27 |
| 2007/0219885 A1 | 9/2007 | Banasiak et al. | |
| 2008/0184270 A1 | 7/2008 | Cole et al. | |
| 2010/0009320 A1* | 1/2010 | Wilkelis | G09B 19/18 434/109 |
| 2010/0020961 A1 | 1/2010 | Spottiswoode | |
| 2010/0114663 A1* | 5/2010 | Casas | G06F 16/902 705/7.31 |
| 2010/0318451 A1 | 12/2010 | Niccolini et al. | |
| 2010/0332287 A1 | 12/2010 | Gates et al. | |
| 2011/0055098 A1 | 3/2011 | Stewart | |
| 2011/0106735 A1 | 5/2011 | Weston et al. | |
| 2011/0137818 A1 | 6/2011 | Goad et al. | |
| 2012/0036037 A1* | 2/2012 | Xiao | G06F 16/24578 705/26.7 |
| 2012/0078766 A1 | 3/2012 | Rose et al. | |
| 2012/0166445 A1 | 6/2012 | Chakrabarti et al. | |
| 2012/0179598 A1 | 7/2012 | Roth | |
| 2012/0239599 A1* | 9/2012 | Matsumoto | G06N 20/00 706/12 |
| 2012/0278091 A1 | 11/2012 | Yaseen et al. | |
| 2012/0278388 A1 | 11/2012 | Kleinbart et al. | |
| 2014/0156347 A1* | 6/2014 | Agrawal | G06Q 30/0202 705/7.31 |
| 2014/0249873 A1 | 9/2014 | Stephan et al. | |
| 2014/0254790 A1 | 9/2014 | Shaffer et al. | |
| 2015/0106091 A1 | 4/2015 | Wetjen et al. | |
| 2015/0134325 A1 | 5/2015 | Skiba et al. | |
| 2015/0139416 A1 | 5/2015 | Skiba et al. | |
| 2015/0195406 A1 | 7/2015 | Dwyer et al. | |
| 2016/0071117 A1 | 3/2016 | Duncan | |
| 2017/0124581 A1 | 5/2017 | Wilson et al. | |
| 2019/0385213 A1 | 12/2019 | Pande et al. | |

OTHER PUBLICATIONS http://www.genesys.com/solutions/customer-engagement/inbound/intelligent-voice-response Paula Bernier; Genesys Interactive Voice Response; copyright 2017; 3 pages.
http://www.genesys.com/solutions/employee-engagement/workforce-optimization/workforce-planning/speech-text-analytics Paula Bernier, Genesys Speech & Text Analytics; copyright 2017; 4 pages.
https://www.researchgate.net/publication/282976793_Automatic_Summarization_of_Call-center_Conversations Evgeny Stepanov <https://www.researchgate.net/profile/Evgeny_Stepanov> et al.; Automatic Summarization of Call-center Conversations; Conference: IEEE Automatic Speech Recognition and Understanding Workshop (ASRU 2015); Dec. 2015; 3 pages.
https://pdfs.semanticscholar.org/3803/10409dd7822c6007d5c76808b8c28698e2cd.pdf W.F. Cody et al., The integration of business intelligence and knowledge management; IBM Systems Journal, vol. 41, No. 4; 2002; 17 pages.
http://ieeexplore.ieee.org/abstract/document/6599389/ Gianmario Motta et al.; Forecasting in multi-skill call centers; 2013 Fifth International Conference on Service Science and Innovation (ICSSI); Oct. 24, 2013; 7 pages.
https://www.unc.edu/~haipeng/publication/poissonSVD.pdf Haipeng Shen et al.; Forecasting Time Series of Inhomogenous Poisson Processes with Application to Call Center Workforce Management; The Annals of Applied Statistics; Jul. 25, 2008; 25 pages.
Raquel Florez-Lopez et al. "Marketing Segmentation Through Machine Learning Models" An Approach Based on Customer Relationship Management and Customer Profitability Accounting, Social Science Computer Review OnlineFirst, published on Aug. 8, 2008 as doi:10.1177/0894439308321592, vol. XX, No. X.
Sara Costa, "Call Flow", https://support.talkdesk.com/hc/en-us/articles/206196766-Call-Flow, Jan. 18, 2018.
YongSeog Kim et al., "Customer Targeting: A Neural Network Approach Guided by genetic Algorithms", Management Science, vol. 51, No. 2, pp. 264-276, Feb. 2005.
Sanford Gayle, "The Marriage of Market Basket Analysis to Predictive Modeling", <http://ai.stanford.edu/~ronnyk/WEBKDD2000/papers/gayle.pdf>, Published 2000, 6 pages.
Non-Final Office Action on U.S. Appl. No. 16/036,699 dated Jul. 23, 2020.
Non-Final Office Action on U.S. Appl. No. 16/037,775 dated May 22, 2020.

* cited by examiner

NEXT PRODUCT PURCHASE AND LAPSE PREDICTING TOOL

CROSS-REFERENCE TO RELATED APPLICATIONS

The present application is a continuation-in-part of U.S. Ser. No. 14/577,402, entitled "LAPSE PREDICTING TOOL AND SCORING MECHANISM TO TRIAGE CUSTOMER RETENTION APPROACHES," filed Dec. 19, 2014, which claims benefit of U.S. Provisional Application No. 61/920,134, entitled "LAPSE PREDICTING TOOL AND SCORING MECHANISM TO TRIAGE CUSTOMER RETENTION APPROACHES," filed Dec. 23, 2013, the entire contents of which are hereby incorporated by reference.

TECHNICAL FIELD

The present disclosure relates in general to management systems for financial products and, more specifically, to systems for customer marketing and customer relationship management.

BACKGROUND

Customers who have previously purchased insurance or other financial products from a diversified financial services business entity may have a need for additional products over time. An individual's insurance needs and needs for other financial products often vary based upon changes in his or her risk profile and other personal circumstances. The financial services business entity may offer a number of life insurance, retirement and investment products. This broad product offering may be difficult to navigate for a customer, and it may be difficult for a financial services business entity to identify especially suitable products for existing customers, and advantageous timing for offering such products. Using conventional methods, to narrow the product offerings in a helpful and appropriate way, a financial services business entity would need to conduct a careful needs analysis requiring the existing customer to answer dozens of questions. Thus, there exists a need for methods of computationally developing a target list of customers who are ready to purchase additional products, and methods of computationally determining suitable products to offer such customers. Individuals purchase insurance products for a variety of reasons. Examples include ensuring payment of funeral services, providing additional income to the individual's family in case of an accident, or providing financial security to a loved one. Thus, for customers who are ready to purchase additional products, there exists a need for computationally determining customer motivations for purchase.

Customers typically pay for purchased insurance products via periodic payments, often through monthly or annual premiums. As individuals face economic hardship, they may not pay one or more of said premiums and the policy may lapse. Generally, lapses in payments result in negotiations with the individuals for continuing with an insurance service, or otherwise terminating the contract. Because of this, these individuals may vary in their value as perceived by the insuring company. The perceived value may play an important role during future transactions, including the discussion of future lapses, and marketing of additional products. However, determining a policyholder's likelihood of lapse and the value of a policyholder remains a challenge. Often, the determination of the individual's likelihood of lapse and value to the company is a labor-intensive, time-consuming endeavor. Thus, there exists a need for methods of computationally predicting the likelihood of lapse, and for promoting retention value of a policyholder or other customer owning a financial product.

SUMMARY

In an embodiment of a processor-based method, a processor executes a predictive machine learning model configured to determine, for each customer record of a plurality of customer records including customer profile data stored in a customer database, a set of product purchase ranks. The method inputs customer purchase history information and the customer profile data into a regression model utilizing gradient boosting. The predictive machine learning model outputs a first subset of the plurality of customer records into a target group and a second subset of the plurality of customer records into a non-target group based upon the set of product purchase ranks. In an embodiment, each of the set of product purchase ranks is representative of a likelihood that a respective customer will accept an offer to purchase a respective product from the set of products of the enterprise.

In an embodiment, the predictive machine learning model is continuously trained using updated customer profile data and updated customer purchase history information. The method runs the predictive machine learning module on demand to update and display a graphical user interface (GUI) by a display device in operative communication with the processor. The graphical user interface (GUI) includes the first subset of the plurality of customer records in the target group, and further includes, for each of the first subset of the plurality of customer records, a favored product from the set of products of the enterprise selected by applying a classification criterion to the set of product purchase ranks.

In an embodiment, a processor retrieves customer purchase history information for a plurality of customer records for a population of customers (also herein called plurality of customers) from an internal customer purchase history database of an enterprise. Additionally, the processor retrieves customer profile information for each customer from one or more demographic databases. In various embodiments, the customer purchase history information tracks previous purchase by each customer of one or more products of the enterprise. In various embodiments, demographic databases can include an internal database and external (third party) database.

In various embodiments, the system and method determine when existing customers of an enterprise are likely to purchase additional products. In an embodiment, the system and method classify each of the plurality of customers into one of a target customer group and a non-target customer group, by determining a highest product purchase score of the set of product purchase scores determined for the respective customer record.

In an embodiment, the predictive model is additionally configured to forecast, within the plurality of customers of the enterprise, the likelihood that given customers will lapse in payment for the one or more products previously purchased by the customer. The predictive model determines a lapse rank representative of a likelihood of lapse by each customer. Various embodiments classify each of the customers into one of a target retention group with highest values of the lapse scores, and a non-target retention group, and generate a report of the customers in the target retention group including the highest lapse scores.

In an embodiment, the graphical user interface (GUI) displays highest product purchase scores of the first subset of the plurality of customer records in the target group, and the products having the highest product purchase scores.

In another embodiment, the customer purchase history information for each of the plurality of customer records includes an initial product purchase from the set of products of the enterprise, and a date of the initial product purchase. The predictive machine learning model outputs a first subset of the plurality of customer records into a target group and a second subset of the plurality of customer records into a non-target group based upon the set of product purchase ranks determined by the predictive machine learning model. Based on this output, the processor updates at least some of the plurality of customer records in the customer database to indicate whether the respective customer record is included in the target group, or is included in the non-target group.

In an embodiment of a processor-based method, a processor executes a predictive machine learning model configured to determine, for each customer record of a plurality of customer records including customer profile data stored in a customer database of an enterprise, at least one product purchase rank associated with at least one product of the enterprise. The method inputs historical purchase information and the customer profile data into a logistic regression model in combination with a decision tree model to continuously train the predictive machine learning model to select a subset of features of the historical purchase information and customer profile data.

The processor automatically generates motivation interpretability data for at least one selected feature outputted from the predictive machine learning model. While the processor is associated with an ongoing communication session with a customer device, the processor generates, for display by a user interface in operative communication with the processor, content comprising alphanumeric text or a visualization graphic based on the motivation interpretability data for the at least one selected feature for a particular customer associated with the customer device.

In an embodiment, the processor-based method determines for each of the customer records a set of highest importance features of the subset of features of the historical purchase information and customer profile data. The method automatically generates motivation interpretability data for each of the highest importance features. The generates content comprising alphanumeric text or a visualization graphic based on the motivation interpretability data including the product purchase rank, the product of the enterprise, the set of highest importance features, and the motivation interpretability data for each of the highest importance features.

In an embodiment of a processor-based method, a processor executes a predictive machine learning model configured to determine, for each customer record of a plurality of customer records including customer profile data stored in a customer database, a set of product purchase ranks. The method inputs historical customer purchase data and the customer profile data into a logistic regression model to continuously train the predictive machine learning model to generate association rules correlating previously purchased products from a set of products of the enterprise with a potential purchase.

The method inputs into the predictive machine learning model a selected customer profile to predict a highest likelihood potential purchase. While the processor is associated with an ongoing communication session with a customer device, the processor generates, for display by a user interface in operative communication with the processor, content comprising an indicator for the highest likelihood potential purchase.

In an embodiment, each of the generated association rules comprises an antecedent itemset of one or more of the previously purchased products from the set of products of the enterprise, and a subsequent itemset of the current purchase of the additional product of the enterprise.

In an embodiment, the method utilizes market basket analysis to select particular association rules from the generated association rules based on support thresholds representing a minimum frequency within a plurality of purchase history transactions in the customer purchase history database. In an embodiment, the method utilizes market basket analysis to select particular association rules from the calculated association rules based on confidence thresholds defining a minimum number of transactions in the customer purchase history database in which the antecedent itemset of the one or more of the previously purchased products appears.

In an embodiment, a processor-based method comprises executing, by a processor, a predictive machine learning model configured to determine, for each customer record of a plurality of customer records including customer profile data stored in a customer database, a set of product purchase ranks by inputting customer purchase history information and the customer profile data into a regression model utilizing gradient boosting, the predictive machine learning model outputting a first subset of the plurality of customer records into a target group and a second subset of the plurality of customer records into a non-target group based upon the set of product purchase ranks, wherein each of the set of product purchase ranks is representative of a likelihood that a respective customer will accept an offer to purchase a respective product from the set of products of the enterprise, and wherein the predictive machine learning model is continuously trained using updated customer profile data and updated customer purchase history information; and running the predictive machine learning module on demand to update and display, by a display device in operative communication with the processor, a graphical user interface (GUI) including the first subset of the plurality of customer records in the target group, and further including, for each of the first subset of the plurality of customer records, a favored product from the set of products of the enterprise selected by applying a classification criterion to the set of product purchase ranks.

In an embodiment, a processor-based method comprises executing, by a processor, a predictive machine learning model configured to determine, for each customer record of a plurality of customer records including customer profile data stored in a customer database, a set of product purchase ranks by inputting customer purchase history information and the customer profile data into a regression model utilizing gradient boosting, the predictive machine learning model outputting a first subset of the plurality of customer records into a target group and a second subset of the plurality of customer records into a non-target group based upon the set of product purchase ranks, wherein each of the set of product purchase ranks is representative of a likelihood that a respective customer will accept an offer to purchase a respective product from the set of products of the enterprise, wherein the customer purchase history information for each of the plurality of customer records includes an initial product purchase from the set of products of the enterprise, and a date of the initial product purchase; and wherein the predictive machine learning model is continuously trained using updated customer profile data and updated customer purchase history information; and updating the plurality of customer records in the customer database to indicate whether the respective customer record is included in the target group or is included in the non-target group.

In an embodiment, a system comprises non-transitory machine-readable memory that stores customer records for a plurality of customers of an enterprise, and a customer purchase history database comprising purchase history information for the plurality of customers of the enterprise, said purchase history information comprising information on previous purchase by each customer of one or more products from a set of products of the enterprise; a predictive modeling module that stores a predictive machine learning model configured to determine, for each of the plurality of customer records, a set of product purchase ranks by applying a regression model utilizing gradient boosting, wherein each of the set of product purchase ranks is representative of a likelihood that a respective customer will accept an offer to purchase a respective product from the set of products of the enterprise; and a processor in operative communication with the display, configured to execute a customer targeting module, wherein the processor in communication with the non-transitory, machine-readable memory and the predictive modeling module executes a set of instructions instructing the processor to: for each of the plurality of customer records of the enterprise, determine the set of product purchase ranks by inputting the customer purchase history information and the customer profile data into the predictive machine learning model, output a first subset of the plurality of customer records into a target group and a second subset of the plurality of customer records into a non-target group based upon the set of product purchase ranks determined; and running the predictive machine learning module on demand to update a graphical user interface (GUI) including the first subset of the plurality of customer records in the target group, and further including, for each of the first subset of the plurality of customer records, a favored product from the set of products of the enterprise selected by a highest product rank of the set of product purchase ranks.

In an embodiment, a processor-based method comprises executing, by a processor, a predictive machine learning model configured to determine, for each customer record of a plurality of customer records including customer profile data stored in a customer database of an enterprise, at least one product purchase rank associated with at least one product of the enterprise by inputting historical purchase information and the customer profile data into a logistic regression model in combination with a decision tree model to continuously train the predictive machine learning model to select a subset of features of the historical purchase information and customer profile data; automatically generating, by the processor, motivation interpretability data for at least one selected feature outputted from the predictive machine learning model; and while the processor is associated with an ongoing communication session with a customer device, generating, by the processor, for display by a user interface in operative communication with the processor, content comprising alphanumeric text or a visualization graphic based on the motivation interpretability data for the at least one selected feature for a particular customer associated with the customer device.

In an embodiment, a processor-based method comprises executing, by a processor, a predictive machine learning model configured to determine, for each customer record of a plurality of customer records including customer profile data stored in a customer database of an enterprise, at least one product purchase rank associated with at least one product of the enterprise, and a lapse rank representative of a likelihood that a respective customer will lapse in payment for the one or more products from the set of products of the enterprise previously purchased by the respective customer, by inputting the customer profile data and historical purchase information for the one or more products previously purchased by the respective customer into a logistic regression model in combination with a decision tree model to continuously train the predictive machine learning model to select a subset of features of the historical purchase information and customer profile data, wherein the historical purchase history information comprises information on previous purchase by each of the one or more customers of one or more products from a set of products of the enterprise; automatically generating, by the processor, motivation interpretability data for at least one selected feature outputted from the predictive machine learning model; and generating, by the processor, for display by a user interface in operative communication with the processor, content comprising alphanumeric text or a visualization graphic based on the motivation interpretability data for the at least one selected feature.

In an embodiment, a system comprises non-transitory machine-readable memory that stores customer records including customer profile data for a plurality of customers of an enterprise, and a customer purchase history database comprising purchase history information for the plurality of customers of the enterprise, said purchase history information comprising information on previous purchase by each customer of one or more products from a set of products of the enterprise; a predictive modeling module that stores a predictive machine learning model configured to determine, for each of the plurality of customer records, at least one product purchase rank associated with at least one product of the enterprise by a logistic regression model in combination with a decision tree model, wherein each of the set of product purchase ranks is representative of a likelihood that a respective customer will accept an offer to purchase a respective product from the set of products of the enterprise; wherein the predictive machine learning model is continuously trained by inputting the historical purchase information and the customer profile data into the logistic regression model in combination with the decision tree model to select a subset of features of the historical purchase information and customer profile data; a processor in operative communication with the display, configured to execute a customer targeting module, wherein the processor in communication with the non-transitory, machine-readable memory and the predictive modeling module executes a set of instructions instructing the processor to: for each of the plurality of customer records of the enterprise, determine the at least one product purchase rank by inputting the customer purchase history information and the customer profile data into the predictive machine learning model, automatically generate motivation interpretability data for at least one selected feature outputted from the predictive machine learning model; and while the processor is associated with an ongoing communication session with a customer device, generate for display by a user interface in operative communication with the processor, content comprising alphanumeric text or a visualization graphic based on the motivation interpretability data for the at least one selected feature for a particular customer associated with the customer device.

In an embodiment, a processor-based method comprises executing, by a processor, a predictive machine learning model configured to determine, for each customer record of a plurality of customer records including customer profile data stored in a customer database, a set of product purchase ranks by inputting historical customer purchase data and the customer profile data into a logistic regression model to continuously train the predictive machine learning model to generate association rules correlating previously purchased products from a set of products of the enterprise with a potential purchase; inputting, by the processor into the predictive machine learning model, a selected customer profile to predict a highest likelihood potential purchase; while the processor is associated with an ongoing communication session with a customer device, generating, by the processor, for display by a user interface in operative communication with the processor, content comprising an indicator for the highest likelihood potential purchase.

In an embodiment, a system comprises non-transitory machine-readable memory that stores plurality of customer records including customer profile data for customers of the enterprise and historical customer purchase data for the plurality of customers of the enterprise, said historical customer purchase data comprising information on previous purchase by each customer of one or more products from a set of products of the enterprise; a predictive modeling module that stores a predictive machine learning model configured to determine, for each of one or more customer records, a set of product purchase ranks by applying a logistic regression model to continuously train the predictive machine learning model to generate association rules correlating previously purchased products from the set of products of the enterprise with a potential purchase; and a processor, configured to execute a customer targeting module, wherein the processor in communication with the non-transitory, machine-readable memory and the predictive modeling module executes a set of instructions instructing the processor to: for each of the plurality of customers of the enterprise, determine the at least one product purchase rank by inputting the customer purchase history information and the customer profile data into the predictive machine learning model; and while the processor is associated with an ongoing communication session with a customer device, automatically generate for display by a user interface in operative communication with the processor, content comprising an indicator for the highest likelihood potential purchase.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
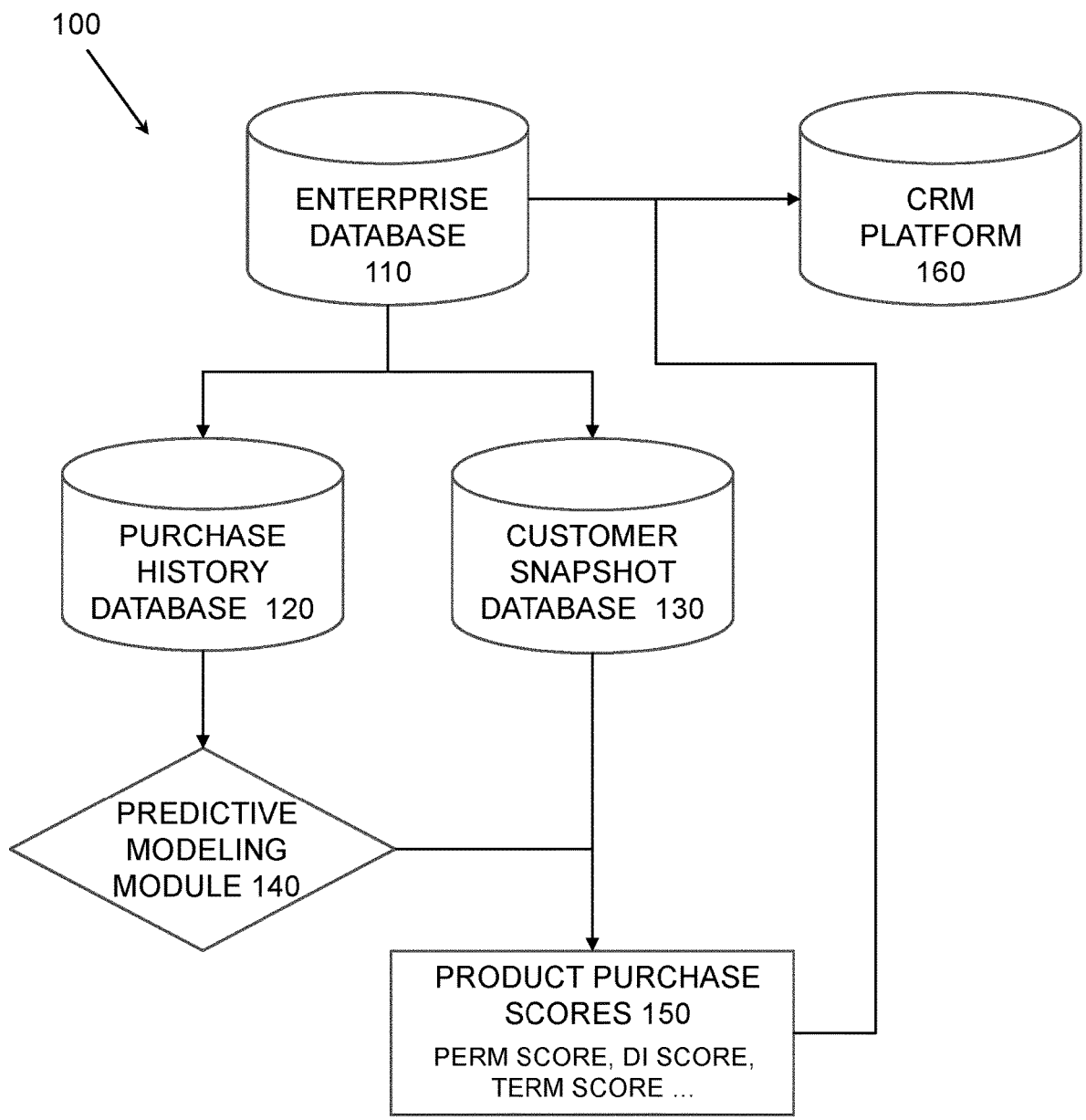
FIG. 1 is a functional block diagram illustrating a predictive model pipeline, according to an embodiment.

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Customers" refers to entities, generally individuals, who own one or more products sold by an enterprise. In an embodiment, the enterprise is a financial services entity such as an insuring company. Customers include, but are not limited to, policyholders who hold one or more policies sold by an insuring company. Alternatively, customers are referred to herein as existing customers, or as product owners. "Customer Record" refers to a record in an internal database of an enterprise or in an external database with information such as customer profile data pertaining to a particular customer.

"Agent" refers to an individual working for a financial services company or working as a broker for a financial services company, in customer relationship management. In an embodiment, an agent may represent an intermediary between an issuing company and a customer. In an embodiment, "agent" refers to an insurance agent, who may sell a variety of insurance products as well as other financial products.

"Products" refers to insurance policies and other financial products offered by a financial services entity. Products include, e.g., financial products owned by customers of the financial services entity, and products that the financial services company offers to its customers. In an embodiment, "products" include a variety of insurance products, including property insurance and casualty insurance, life insurance, health insurance, disability insurance, and long-term care insurance, as well as other financial products such as annuities.

"Policy" refers to a contract insuring a person or goods.

"Policyholder" refers to any entity that holds one or more insurance policies.

"Premium" refers to a payment, or one of the periodic payments, a policyowner agrees to make for a policy. Depending on the terms of the policy, the premium may be paid in one payment or a series of regular payments, e.g., annually, semi-annually, quarterly or monthly.

"Rider" refers to an amendment to a policy contract. In an embodiment, riders provide additional benefits to an insurance policy, and may require an additional premium.

"Lapse" refers to the inability of a policyholder or other owner of a financial product to pay, at a time previously agreed upon with a policy issuer, a premium or other cost associated with a policy or other financial services product held.

"Face Value" refers to the value of a policy or other financial product to be provided upon maturity, date, or death.

"Lifetime Value" refers to the sum of all associated costs of a financial services entity for a product owned by a customer over product lifetime, netted against revenue for the product sale.

"Value of Retention" refers to a potential value of maintaining business associated with a policyholder or other customer.

"Cross-Selling" refers to marketing and "Cross-Sale" refers to a sale to a customer that owns one or more products of an enterprise, of an additional product of the enterprise. In an embodiment, "cross-sale" refers to a sale at least six months after the customer's date of initial product, of a product in a different major product family than any previously purchased product.

"Up-Selling" refers to marketing and sale to a customer that owns a product of an enterprise with a face value, of an additional face value of the product owned.

The present disclosure addresses a need for computer-implemented methods to forecast actions by customers of an enterprise who own one or more products of an enterprise, wherein the actions may significantly improve the lifetime value of these customers to the enterprise. These predictive models forecast the likelihood of a customer's purchasing additional products and/or additional face amounts of previously purchased products, of the enterprise. Additionally, these predictive models forecast the likelihood of a customer's lapsing in payments for a policy, or other product of the enterprise, owned by the customer.

In an embodiment, agents representing an enterprise can use such forecasts to identify customers within a population of customers who have purchased one or products of the enterprise, wherein these customers have the highest likelihood of beneficial action or detrimental action, in order to target these customers for marketing actions to encourage the beneficial action or discourage the detrimental action. In an embodiment, agents receive forecasts from a predictive model to identify customers with high probability of purchasing additional products of the enterprise, sometimes herein called "next product purchase" (NPP). In an embodiment, agents use forecasts from a predictive model to identify customers with high probability of lapse, i.e., failure to pay premium or other costs associated with a product.

In an embodiment of a processor-based method, a processor receives customer purchase history information (also herein called purchase history information) for a population of customers from an internal customer purchase history database of an enterprise. The customer purchase history information tracks previous purchases by each customer of one or more products of the enterprise. Additionally, the processor receives customer profile information for each customer from one or more demographic databases. In an embodiment, the demographic databases include an internal database of the enterprise and an external (third-party) database.

The processor executes a predictive model configured to determine, for each of the plurality of customers, a set of product purchase scores by applying an NPP predictive model to the purchase history information and the customer profile information. In an embodiment, the predictive model comprises a combination of gradient boosting with a regression model that determines when existing customers of an enterprise are likely to purchase additional products. In an embodiment, the regression model uses logistic regression.

The processor-based method of the present disclosure classifies each of the plurality of customers into one of a target customer group and a non-target customer group, by applying a classification criterion to the set of product purchase scores determined for the respective customer. The method then generates, for display by a user interface in operative communication with the processor, a report of the customers in the target customer group including the highest product purchase scores and the products having the highest product purchase scores. In an embodiment, the NPP predictive model exposes customers who lack products that the customers are likely to purchase. In various embodiments, the NPP model identifies products that customers with similar customer profiles already possess. In an embodiment, the NPP model identifies significant relationships between products already owned by customers and target products that are likely to be purchased by the customers. In the present disclosure, a product identified by the NPP model as likely to be purchased by a customer is sometimes called a "favored" product.

In an embodiment, the predictive model is additionally configured to forecast, within the population of customers of the enterprise, the likelihood that given customers will lapse in payment for the one or more products previously purchased by the customer. In an embodiment, the predictive model determines for each customer within the population a lapse score representative of a likelihood of lapse by respective customer. The processor-based method classifies each of the customers into one of a target retention group with highest values of the lapse scores, and a non-target retention group; and generates a report of the customers in the target retention group including the highest lapse scores.

In an embodiment, a processor-based method retrieves purchase history information for one or more identified customers from an internal customer purchase history database of an enterprise. Additionally, the processor retrieves customer profile information for each of the customers from one or more demographic databases. The processor executes a predictive model to determine, for each of the customers, at least one product purchase rank associated with at least one product of the enterprise. The predictive model applies a logistic regression model in combination with a decision tree model to the purchase history information and the customer profile information. In an embodiment, the logistic regression model was previously trained by selecting a subset of features of the customer purchase history information and of the customer profile information.

As used in the present disclosure, a product purchase rank can include a raw product purchase score. In an embodiment, a higher product purchase score may indicate a higher probability of a successful cross sale. In another embodiment, a product purchase rank incudes a tier corresponding to a given product purchase score, wherein the tier is selected from a plurality of tiers that are based upon a distribution of product purchase scores for a population of customers of the enterprise. For example, "low", "medium" and "high" tiers may represent different segments or tiers within the distribution of product purchase scores. In an embodiment, a product purchase rank includes a percentile classification of a given product purchase score relative to all product purchase scores for a population of customers of the enterprise. In an embodiment, a product purchase rank can include a combination of the above types of rank.

In an embodiment, the processor-based method determines for each of the customers a set of highest importance features of the subset of features. The method automatically generates motivation interpretability data for each of the highest importance features. The system and method updates a graphical user interface (GUI) generate a report for each of the one or more customers, for display by a user interface in operative communication with the processor, for example to generate a report for each of the one or more customers. The report includes the product purchase rank, the product of the enterprise, the set of highest importance features, and the motivation interpretability data for each of the highest importance features.

In an embodiment, the logistic regression model is trained by selecting the subset of features using a recursive feature elimination mechanism of the decision tree model. In an embodiment, the set of highest importance features comprises features with highest absolute value of importance coefficients.

In an embodiment, the motivation interpretability data comprises one or more of explanatory text data and visualization graphic data. In an exemplary embodiment, the motivation interpretability data provides information on a product of the enterprise as a recommended product for a customer, and describes motivations of the customer to purchase the recommended product. In another exemplary embodiment, the motivation interpretability data describe reasons for variations in product purchase rank of different customers in the book of business of an agent of the enterprise.

In an embodiment, a logistic regression model, which is configured to determine at least one product purchase rank associated with at least one product of the enterprise, is trained by performing market basket analysis mining on data in an internal customer purchase history database of the enterprise. The market basket analysis calculates a plurality of association rules correlating previously purchased products from the set of products of the enterprise with a current purchase of an additional product of the enterprise.

In an embodiment, each of the calculated association rules comprises an antecedent itemset of one or more of the previously purchased products from the set of products of the enterprise, and a subsequent itemset of the current purchase of the additional product of the enterprise.

In an embodiment, the market basket analysis selects particular association rules from the calculated association rules based on support thresholds representing a minimum frequency within a purchase history transactions in the customer purchase history database. In an embodiment, the market basket analysis selects particular association rules from the calculated association rules based on confidence thresholds defining a minimum number of transactions in the customer purchase history database in which the antecedent itemset of the one or more of the previously purchased products appears.

In an embodiment, during training of the predictive module, the market basket analysis mines purchase history data from an internal customer purchase history database of the enterprise that tracks, for each customer of the enterprise, the initial product purchased and date of first purchase, and new and cumulative purchases of products of the enterprise during customer-years commencing from anniversaries of the customer's date of first purchase. In an embodiment, the market basket analysis treats each individual customer year as a negative label within training data, and treats each sale year as a positive label within training data.

In an embodiment, the predictive model (also called predictive machine learning model in the present disclosure) periodically forecasts next product purchases (NPP) and/or lapses for a population including all current customers of the enterprise. In an embodiment, an agent of the enterprise can select customers within a book of business of the agent, and run NPP and/or lapse reports to plan marketing and sales activities. In an embodiment, an NPP report presents information generated by the predictive model on products having the highest product purchase scores as recommended products for the respective customers. The recommended products can be different from one or more products previously purchased by the respective customers. The recommended products also can include an additional face amount of one of one or more products previously purchased the respective customers (up-selling).

In various embodiments, the method and apparatus of the invention operate in conjunction with a customer relationship management (CRM) platform that is used by agents to interact the customers of the enterprise. In an embodiment, the CRM platform updates and displays a graphical user interface (GUI) representing topics relating to predicted next product purchases, enabling the agents to discuss these topics in cross-selling of an additional product or up-selling of an additional face amount. As used herein, agent-customer contacts aided by such information are sometimes called "treatments." NPP reports and dashboards can improve agent productivity by helping agents plan the amount of time to spend on cross-selling versus other activities; and by increasing agents' conversion rate for customers who are engaged.

In various embodiments, the system initiates an ongoing communication session with a client device of a customer in the target customer group to display a graphical user interface (GUI) that can present a favored product, and motivating factors for the customer to purchase the favored product. The ongoing communication session can include email, chat, texting, over-the-top messaging, or others.

The methods and systems of the present disclosure utilize product data on a set of products of the enterprise. In an embodiment, such product data is stored in an internal product database of the enterprise. In an embodiment, products of the enterprise include major products, also herein called product types. Products of the enterprise also include minor products, which are subsets of the major products. Additionally, products of the enterprise may include tertiary or additional subsets of products of the enterprise. In an embodiment, in predictive modeling, lower levels of product categories are conflated into product classes. In an embodiment, the system retrieves product data from the internal product database of the enterprise, and includes the retrieved product data in reports generated by the predictive model for the customers in the target customer group.

In an embodiment, products of the enterprise include riders. Riders can provide extra benefits or options added onto policies. In an embodiment, one product feature, waiver of premium rider ("wp"), was found to be consistently predictive of cross-sale. A waiver of premium rider waives policyholders' obligation to pay premiums if they become seriously ill. Other exemplary product features included risk class, deferral period, period certain duration, and total net payout for Fixed Annuities. In various embodiments, risk class was based on mortality for life products, and was based on occupation for disability products.

In an example of major and minor products shown in Table 1, major product types (Major_product) included PERM (permanent life insurance), TERM (term insurance), DIS INC (disability income), FA (fixed annuity), and NTL (non-traditional life). Exemplary minor products (Minor_product) within these product types are shown in the column Minor_product/Product Name. In an embodiment, the NPP predictive model included a component predictive model for each of the Major_product types of Table 1. The predictive machine learning model utilized purchase history information for additional product types, but did not generate product purchase scores for these other products. In an exemplary embodiment, other product types used in purchase history information include MF (mutual funds), BR (brokerages), MMGR (money manager), and VAR (variable annuity).

TABLE 1

MAJOR PRODUCTS & MINOR PRODUCTS

| Major_product | Minor_product/Product Name |
|---|---|
| PERM | Whole Life Legacy 100 |
| | Whole Life Legacy 65 |
| | Whole Life |
| TERM | Vantage Term 20 |
| | 20 Year Level Term Guaranteed |
| | Vantage Term - 10 |
| DIS INC | Radius Base |
| | MaxElect Simplified |
| | Flex Elect Base |
| FA | MassMutual Odyssey |
| | MassMutual Odyssey Plus |
| | MassMutual Odyssey Select |
| NTL | Universal Life Guard 2 |
| | Universal Life Guard |
| | Variable Universal Life 2 |

A key metric for value-based classification of a customer who has purchased a product is herein called a "lifetime value" of the product sale to that customer. In various embodiments, lifetime value includes the sum of all associated costs over product lifetime, netted against revenue (e.g., premiums paid) for the product sold. In an exemplary embodiment involving sale of an insurance policy, associated costs include various sales acquisition costs, including marketing costs distributed across inbound calls, cost of operating the inbound contact center distributed across inbound calls, and commission at the time of sale. In this example, additional associated costs include cost of providing the insurance policy, and claims or death benefits. In an exemplary embodiment of sale of a policy, lifetime value for the policy sold to that customer is the net value of all premiums paid over the sum of all such associated costs during that policy life. In an embodiment, agents of the enterprise pursue marketing and sales activities based upon modeled lifetime values in computer-generated NPP reports, or computer-generated lapse reports, to increase the value of targeted customers. In an embodiment, computer-generated lapse reports ascribe a value of retention to customers, and include various modeled lifetime values generated based on different assumptions, such as different pricing assumptions for negotiation of policy renewal.

In various embodiments, agents may increase lifetime value through cross-selling or up-selling to customers based on graphical user interfaces (GUIs) updated and displayed by NPP predictive machine learning models. Such GUIs, and CRM reports and dashboards including the GUIs, enable targeting of customers with a high readiness to purchase, and enable targeted product selection for marketing to such customers. Agents also may increase lifetime value through actions aimed at mitigating loss of lifetime value due to prospective lapse.

Frequency of successful cross-sales is one metric for performance of the NPP predictive models in aiding marketing and sales activities by agents of the enterprise. In an embodiment, a successful cross-sale is defined as a sale of an additional product in a different major product family than any product previously purchased by the customer, wherein that sale is effected at least six months after the customer's date of first purchase. By defining a first purchase history period that starts at the first purchase and spans six months, rather than a year, sales occurring less than 6 months after the initial purchase are considered a bundled purchase rather than a cross-sale.

FIG. 1 is a schematic diagram of a predictive model pipeline 100. Predictive model pipeline 100 can be executed by a server, one or more server computers, authorized client computing devices, smartphones, desktop computers, laptop computers, tablet computers, PDAs and other types of processor-controlled devices that receive, process, and/or transmit digital data. Predictive model pipeline 100 can be implemented using a single-processor system including one processor, or a multi-processor system including any number of suitable processors that may be employed to provide for parallel and/or sequential execution of one or more portions of the techniques described herein. Predictive model pipeline 100 performs these operations as a result of central processing unit executing software instructions contained within a computer-readable medium, such as within memory. In one embodiment, the software instructions of the system are read into memory associated with the predictive model pipeline 100 from another memory location, such as from a storage device, or from another computing device via communication interface. In this embodiment, the software instructions contained within memory instruct the predictive model pipeline 100 to perform processes described below. Alternatively, hardwired circuitry may be used in place of or in combination with software instructions to implement the processes described herein. Thus, implementations described herein are not limited to any specific combinations of hardware circuitry and software.

Data flow in predictive model pipeline 100 starts with enterprise database 110. In an embodiment, enterprise database 100 includes, among other data, product data, purchase history information data for product owners, and customer profile information for product owners. Exemplary product data sourced from enterprise database 110 include specific product type; information on riders; financial data on face amount, premiums, and benefits; and risk class data such as mortality and occupation data. Customer purchase history information includes information on customer's first purchase and date of first purchase, and information on new and cumulative purchases during each customer-year following date of first purchase. Exemplary customer profile information stored in enterprise database includes age, gender, information about an insured and beneficiaries. In an exemplary embodiment, enterprise database 100 uses TERA- DATA® massively parallel processing (MPP) enterprise data platforms of Teradata Corporation, Miamisburg, Ohio. TERADATA® is a registered trademark of Teradata US, Inc.

In NPP predictive model pipeline 100, data retrieved from enterprise database 110 is supplied to customer purchase history database 120 and current customer snapshot database 130. An important aspect of predicting readiness to purchase in the "next product purchase" (NPP) predictive model is timing of purchases. The purchase history database 120 stores purchase history information, also herein called product owner purchase history, for the population of customers to be modeled. In an embodiment, product owner purchase histories track purchases of each customer started from the product owner's first purchase and include all new and cumulative purchases. In an embodiment, an annual chronology of purchase history tracks purchases by customer-year. The first year (Year 1) starts with the date of first purchase. Year 2 commences at the one-year anniversary of the date of first purchase, etc. In an embodiment, purchase history information also tracks purchases within the first six months after the date of first purchase separately. Applicant has observed that NPP predictive models can distinguish between customer-years in which customers convert to a cross-sale and customer-years in which they do not, with high model performance.

In an embodiment, instances of customer-year in customer purchase history database 120 use a longitudinal data format. In an embodiment, the enterprise collected purchase history information for all current customers, and constructed a longitudinal data set over different lines of business (different major and minor products). Longitudinal data tracks the same sample at different points in time. In an embodiment, a row of data in customer purchase history database 120 contains a snapshot of cumulative information about the customer and purchased products for one customer-year. In an embodiment, customer purchase history data tracks owner-level features and product-level features. In an exemplary embodiment, owner-level features, such as age and gender, were populated for every customer-year, while product-level features were only populated for customer-years in which the customer purchased that product.

In various embodiments, product-level features in customer purchase history database 120 are organized by columns representing specific product types. In an embodiment, purchase history data for a given product type during a given customer-year use a Boolean denoting whether or not at least one purchase of that product type was made during that customer-year. In an embodiment, purchase history data also includes cumulative indicators for product ownership, e.g., data indicating that the given customer has purchased a given product during a previous time period.

Current customer snapshot database 130 contains current customer profile data such as age, gender and financial standing. Current customer profile data can be significant predictors in the predictive models of the present disclosure. Often such features are time dependent in relation to a customer's needs and likelihood to purchase given products. For example, a customer's first product typically fits the customer's needs at the time of first purchase. Over time, as the customer's profile changes, another product may better suit the customer's needs. Additional exemplary customer-level features include social security number, and median income by zip code.

In an embodiment, in addition to customer profile data extracted from enterprise database 110, current customer snapshot database 130 contains data retrieved from a third-party demographic database (not shown). Third-party demographic data can include extensive details of customer profiles not tracked in an enterprise's internal customer profile database. Examples of such third-party demographic data include general purchasing behaviors, credit worthiness, and products purchased from providers other than the enterprise. In an embodiment, current customer snapshot database retrieves data from the ACXIOM® customer demographics database maintained by Acxiom Corporation, Little Rock, Ark. ACXIOM® is a registered trademark of Acxiom Corporation.

In an embodiment, ACXIOM customer demographics data include individual level data on customers. In various embodiments, as a prerequisite to using ACXIOM data in predictive modeling of a customer), current customer snapshot database 130 associates the ACXIOM data with a customer identifier for the customer. In an exemplary embodiment, Acxiom customer demographics data used in modeling of a customer requires an exact match of name and address. In an embodiment, ACXIOM customer demographics data also include data using zip-level features of the ACXIOM system, which provide a coarser representation in building the predictive model. Such zip-level features employ variables in Acxiom that have resolution at the zip-level for each individual in the zip code. In an exemplary embodiment, zip-level data for individual income is associated with a zip code median value in Acxiom.

Databases 110, 120, 130 are organized collections of data, stored in non-transitory machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating and/or administration of databases. The databases may conform to a well-known structural representational model, such as relational databases, object-oriented databases and network databases. Exemplary database management systems include MySQL, PostgreSQL, SQLite, Microsoft SQL Server, Microsoft Access, Oracle, SAP, dBASE, FoxPro, IBM DB2, LibreOffice Base, FileMaker Pro.

In an embodiment, predictive model pipeline 100 labels each data element stored in ACXIOM as continuous (including interval), binary, ordinal, or nominal (categorical). For use in logistic regression models within predictive modeling module 140, variables that have lookup fields are converted to integers. Following feature transformation of the ACXIOM variables, the final view outputs each variable with human-readable names (if known), and a tag at the end of the variable name. Exemplary end tags for transformed variable names include:
  _binary: either 0 or 1
  _ordinal_to_binary: either 0 or 1, where null values are mapped to 0
  _flat_binary: mapped from a string field like "01001000" into multiple fields
  _ordinal: as an integer, with null values left null
  _interval: as an integer, with null values left null
  _continuous: as an integer, with null values left null
  _nominal: as an integer, with null values mapped to an additional integer Predictive modeling module 140 applied a logistic regression model utilizing gradient boosting to couple optimal performance with interpretable results. Models are trained on a set of historical customer-year instances and then used to score the susceptibility of customers to cross-sale during their most recent customer-year, which corresponds to the present date. In an embodiment, the predictive modeling module trains a logistic regression model with a full set of features of databases 120, 130.

In an embodiment, predictive modeling module 140 includes a plurality of component predictive models that determine a set of product purchase scores 150. Each of the component predictive models targets likelihood of purchasing one of the respective products from the set of products of the enterprise, and determines a respective product purchase score within the set of product purchase scores.

Product purchase scores module 150 is configured to provides a set of product purchase scores for each customer. In an embodiment, in applying the predictive modeling module to a given customer, product purchase scores generated by all component predictive models that correspond to products not already owned by the customer are compared to determine the most likely product for next product purchase. In an embodiment, product purchase scores module provides one or more of a PERM score, TERM score, DIS INC score, FA score, and NTL score for each customer. In an embodiment, product purchase scores module 150 is also configured to provide a lapse score for each customer modeled, in addition to the set of product purchase scores.

An API of the predictive modeling module 140 and the product purchase scores module 150 interfaces with CRM platform 160. In an embodiment, the API routes updated graphical user interfaces (GUIs) generated by the predictive model to the CRM platform, and routes customer relationship data from the CRM platform to the predictive model. In an embodiment, GUIs generated by the predictive model are displayed at user interfaces of agent devices 170, 180. In an embodiment, the GUIs are displayed to agents of the enterprise via one or more report or dashboard of the customer relationship management (CRM) platform 160. In an embodiment, CRM platform 160 is the SALESFORCE® cloud computing customer relationship management (CRM) platform of Salesforce.com, Inc., San Francisco, Calif., which provides users with an interface for case management and task management, and a system for automatically routing and escalating important events. SALESFORCE® is a registered trademark of Salesforce.com, Inc., San Francisco, Calif.

Use of logistic regression for classification problems provides performance advantages over standard linear regression, because application of the logistic function to the raw model score maps the output precisely from 0→1 while providing a smooth decision boundary. In an embodiment, a logistic regression model with $l_1$ regularization utilizes LASSO (Least Absolute Shrinkage and Selection Operator), a regression analysis method that performs both variable selection and regularization to enhance prediction accuracy and ease of interpretation of the resulting statistical model.

For compatibility with logistic regression, a procedure for training the predictive machine learning model discretized variables, treating each bin as a distinct level of a categorical variable, including a bin for missing values. An adjacent pooling bucketing scheme was used to create bins that would provide meaningful interpretations of scores. Adjacent pooling is a bivariate approach that uses both target variable values and numeric covariate values to determine optimal bucketing. Binary target variables and numeric covariate values were extracted and the numeric covariates were used to bucket the records equally into many initial buckets (e.g., 50 buckets). Then, for each pair of adjacent buckets, the buckets were combined before calculating a difference in information value, defined as:

$$\text{Information Value} = \Sigma_{k=1}^{k} (g_k - b_k) * \log(g_k/b_k)$$

In the above formula, $g_k$ and $b_k$ are the ratios of positive and negative labels in each bucket out of all k buckets. In an exemplary embodiment, the first pass on a variable split the records into 50 equal buckets. Then 49 different adjacent pairs were compared to select the combination of pairs that resulted in the least data reduction. The process was continued until each variable was separated into the desired number of buckets, usually 10 or fewer.

Gradient boosting produces a predictive model in the form of an ensemble of weak predictive models, typically decision trees. In an embodiment, predictive modeling module 140 incorporated the GBM package cgbm (Generalized Boosted Regression modeling) for gradient boosting. In an exemplary embodiment, gradient boosting used 10,000 decision trees, a minimum number of observations per terminal node of 10, and an interaction depth of 10 to test gradient boosting for all product types.

In another embodiment, a decision tree model is a random forests model. Random forests is a class of ensemble methods used for classification problems. Random forests models work by fitting an ensemble of decision tree classifiers on sub samples of the data. Each tree only sees a portion of the data, drawing samples of equal size with replacement. Each tree can use only a limited number of features. By averaging the output of classification across the ensemble, the random forests model can limit over-fitting that might otherwise occur in a decision tree model.

In various embodiments, predictive machine learning modeling module 140 identifies high importance features that have the most pronounced impact on predicted value, i.e., highest importance coefficient. In an embodiment, a logistic regression model is trained by selecting a subset of features of the purchase history information stored by the internal customer purchase history database and of the customer profile information stored by the customer demographic database(s).

TABLE 2

Highest Importance Features

| Importance | Feature |
|---|---|
| −2.7125 | expectant_parent_nominal |
| −0.3126 | recent_divorce_nominal_0 |
| −0.2634 | credit_card_new_issue_nominal_0 |
| −0.1438 | gender_input_individual_nominal_0 |
| 0.1117 | socially_influenced_ordinal |
| 0.0890 | home_length_of_residence_interval |
| −0.0757 | likely_investors_nominal_0 |
| −0.0667 | vacation_travel_international_would_enjoy_ordinal_to_binary |

TABLE 2-continued

Highest Importance Features

| Importance | Feature |
|---|---|
| 0.0637 | total_liquid_investible_assets_fin_ordinal |
| −0.0632 | new_mover_nominal_0 |
| −0.0518 | single_parent_ordinal_to_binary |
| −0.0517 | vacation_travel_time_share_have_taken_ordinal_to_binary |
| −0.0455 | investments_real_estate_ordinal_to_binary |
| 0.0438 | investments_stocks_bonds_ordinal_to_binary |
| 0.0429 | obtain_life_insurance_along_with_loan_mortgage_installment_payments_ordinal |

Table 2 shows the top 15 features from a likelihood to purchase model. The most important features are identified by the highest absolute value of the importance coefficient. The most important feature of this target is the expectant_parent_nominal variable, where a 0 corresponds to not expectant. Positive and negative signs of the importance coefficient indicate whether an increases, or a decrease, of the feature increases likelihood of the target. This data indicates that non-expectant parents are less likely to purchase. This expectant_parent_nominal feature is an example of a customer life event creating a perceived need for a product.

Model training of different component models can identify different features as most important. For example, a model based upon a Next Product Purchase PERM signal may identify different leading features than a model based upon a Next Product Purchase TERM signal. In an embodiment, logistic regression models treated bucketed features as categorical variables, and returned coefficients for each level (bin) of each bucketed feature. These coefficients provide insight into which variables are predictive, and that values at which they are predictive.

In an exemplary embodiment, Table 3 summarizes top predictive features, and values, for five product families. In this data, age was highly predictive for all product families. Perm, Term, and Disability were more marketable to young and middle-aged adults, while Fixed Annuities and Non-Trad Life were more likely to be purchased by older customers. Previous ownership of investment products such as Mutual Fund, Brokerage, or Third Party Money Manager were predictive of cross-sale for any product. Customers who had purchased a Term policy were more likely to purchase additional life insurance products such as Perm or Non-Trad Life, and those with high-value policies were likely to purchase Disability. Customers who had purchased a Perm policy were more likely to purchase Term if their Perm policy had an "Ultra" risk class, and were likely to purchase Disability if their Perm policy had a high face amount.

TABLE 3

Features and Values listed from Most to Least Predictive

| Product | Predictive Features | Predictive Values |
|---|---|---|
| PERM | Age | 20-37, 37-42, and 42-44 |
| | Purchased major product type | Third Party Money Manager, Mutual Fund, Brokerage, Fixed Annuity |
| | Purchased minor product type | Variable Term ART |
| | Disability premium higher | Values |
| TERM | Age | 26-34, 34-37, and 37-40 |
| | Purchased minor product type | Radius (Disability Income) |
| | Purchased major product type | Third Party Money Manager, Mutual Fund |
| | Perm risk | Ultra |
| | Median income of zip code | Above 81,100 |
| DISABILITY | Age | 21-30, 30-38 and 38-45 |
| | Non-Trad | Life face amount Above 250,000 |
| | TERM face amount | Above 1,100,000 |
| | PERM face amount | Above 500,000 |
| | Purchased major product type | Third Party Money Manager, Mutual Fund, Brokerage |
| FIXED ANNUITY | Age | 63-87, 58-63, and 56-58 |
| | Purchase major product type | Perm, Variable Annuity, Third Party Money Manager, Mutual Fund |
| NON-TRAD LIFE | Age | 50-69, 69-78, and 46-50 |
| | Previous minor product type | Variable Term ART, Variable Term, 10 |
| | Previous major product type | Mutual Fund, Brokerage, Third Party Money Manager |

Figure 2:
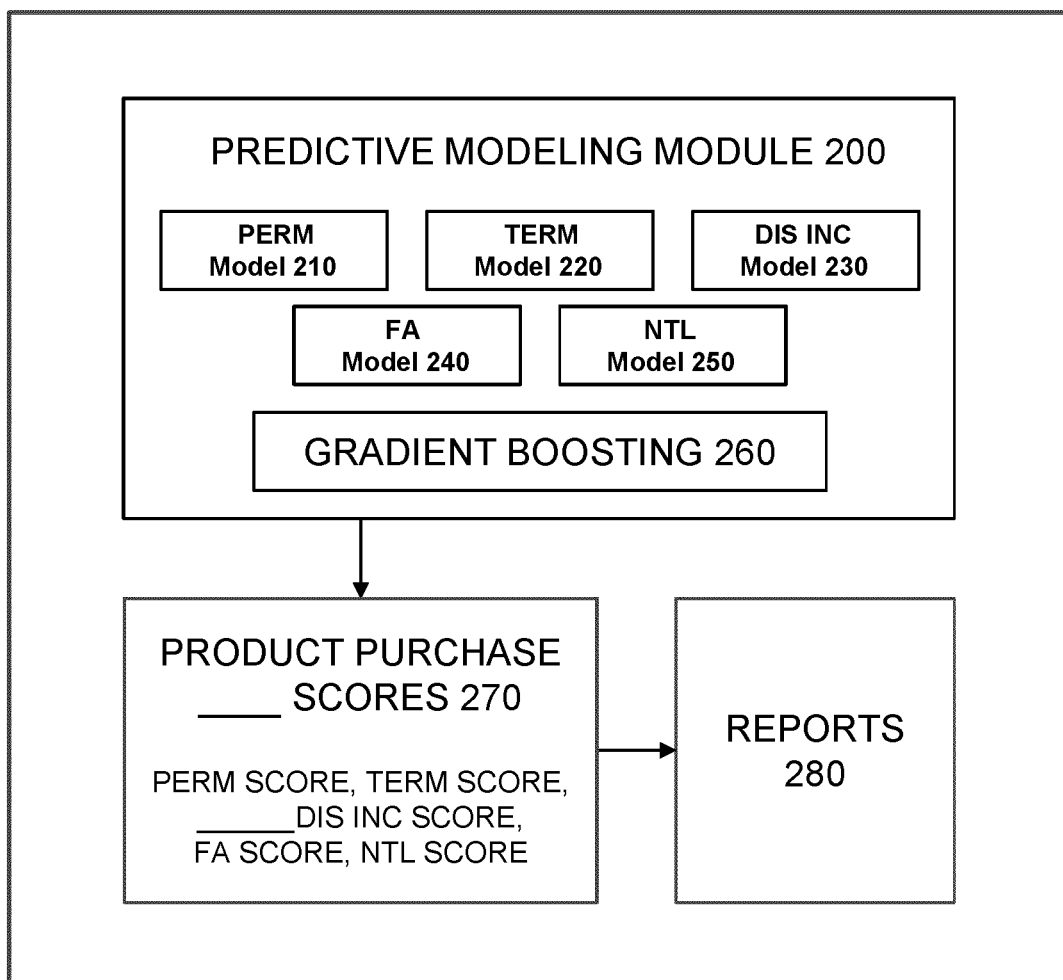
FIG. 2 is a block schematic diagram of components of a predictive model pipeline, according to an embodiment.

In the embodiment of FIG. 2, components of a predictive model pipeline include a predictive modeling module 200, product purchase scores module 270, and reports module 280. Predictive modeling module 200 includes a plurality of component predictive models including logistic regression modules for each of the major product types of Table 1. These component predictive models includes PERM model 210, TERM model 220, DIS INC model 230, FA model 240 and NTL model 250. Predictive modeling module 200 also includes Gradient Boosting module 260. Product purchase scores module 270 is configured to provide a PERM score, TERM score, DIS INC score, FA score, and NTL score to reports module 280.

Figure 3:
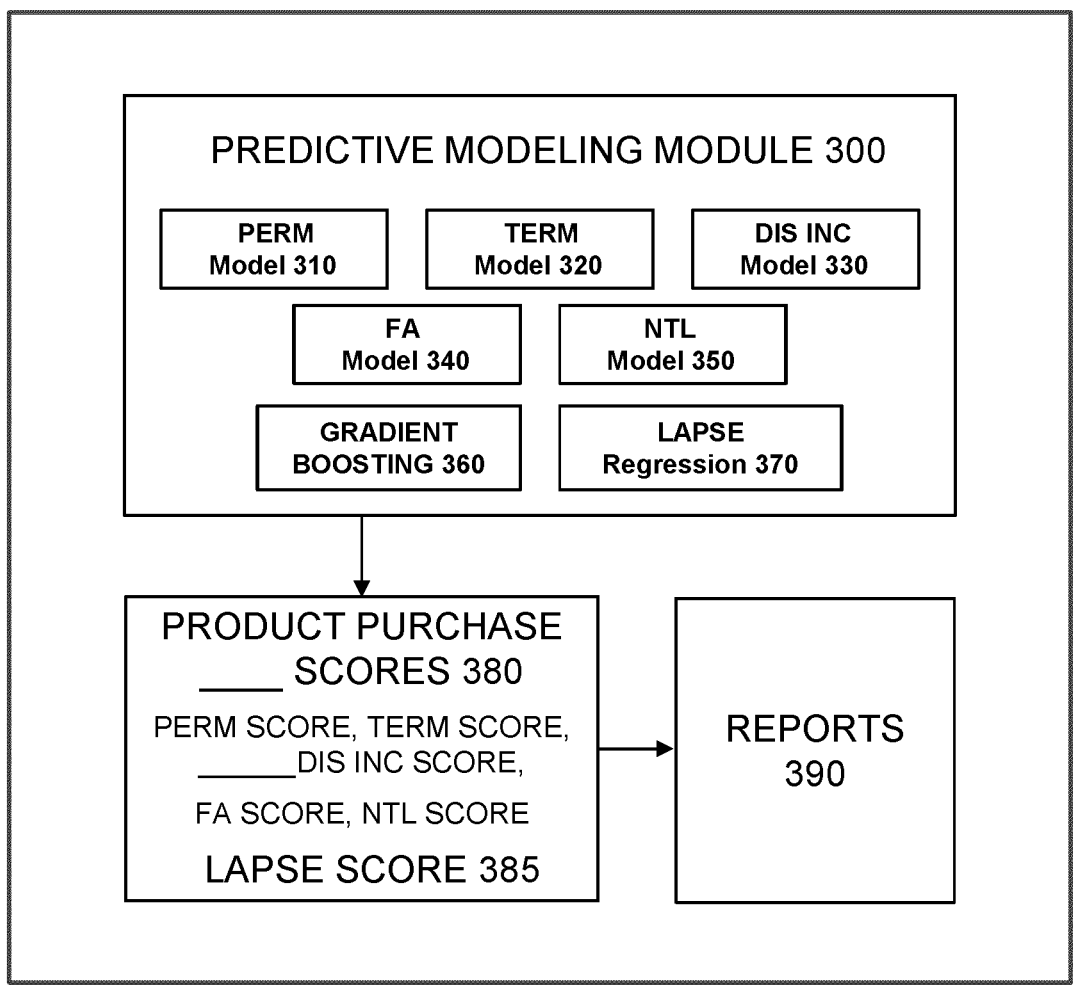
FIG. 3 is a block schematic diagram of components of a predictive model pipeline, according to an embodiment.

In the embodiment of FIG. 3, components of a predictive model pipeline include a predictive modeling module 300, product purchase scores module 380, and reports module 390. Predictive modeling module 200 includes a plurality of component predictive models including logistic regression modules 310-350 corresponding to the component regression models of predictive modeling module 200, as well as Gradient Boosting module 360. In addition, predictive modeling module 300 includes a Lapse regression model 370, which determines a lapse score for each of the customers modeled. Product purchase scores module 380 is configured to provide a PERM score, TERM score, DIS INC score, FA score, and NTL score, as well as LAPSE score, to reports module 390.

Figure 4:
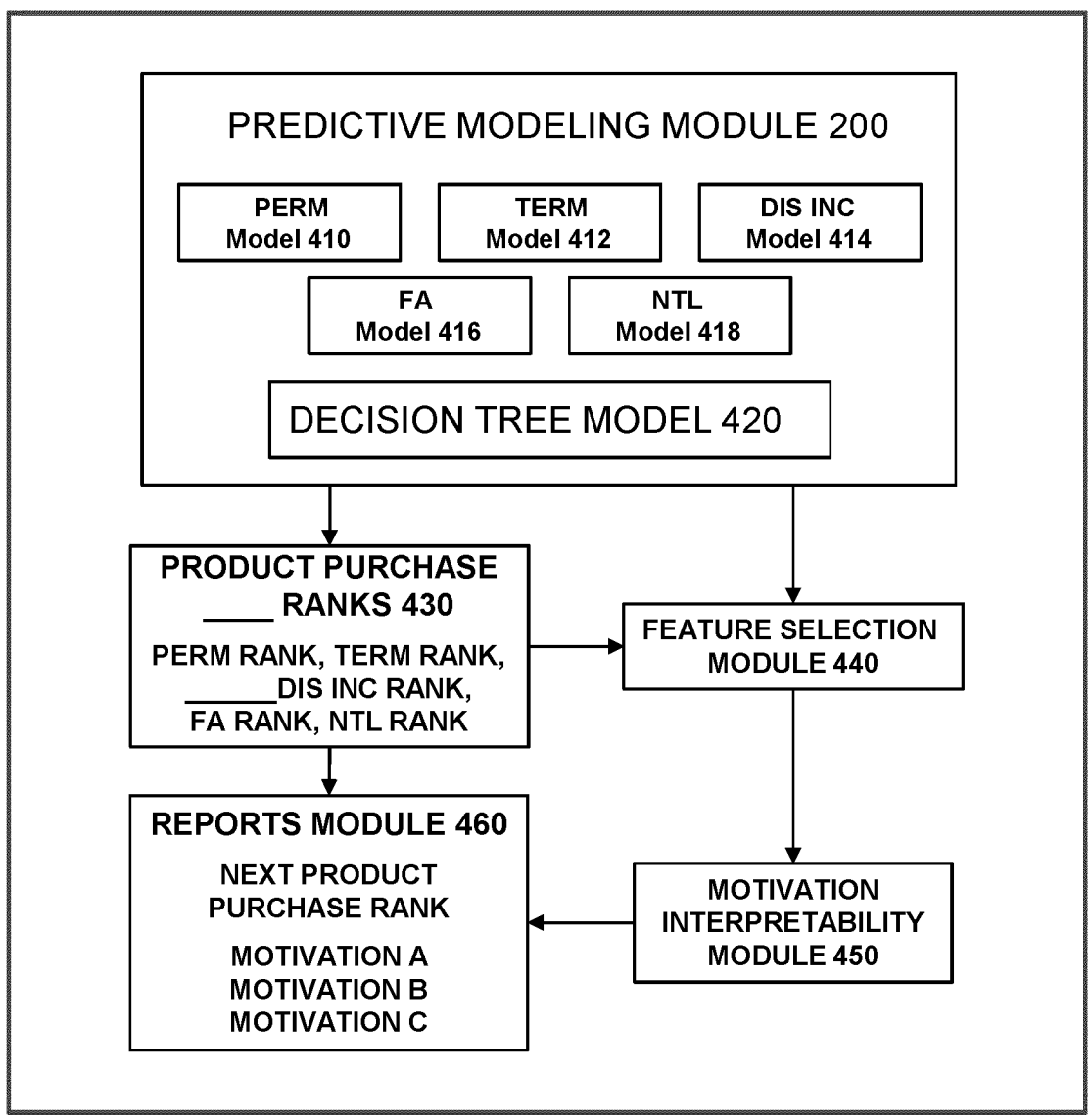
FIG. 4 is a block schematic diagram of components of a predictive model pipeline, according to an embodiment.

In the embodiment of FIG. 4, components of a predictive model pipeline include a predictive modeling module 400, product purchase ranks module 430, feature selection module 440, motivation interpretability module 450, and reports module 460. Predictive modeling module 400 includes a plurality of component regression models 410-450 corresponding to the component regression models of predictive modeling module 200, as well as decision tree model 420. Product purchase ranks module 430 is configured to determine a highest rank among a PERM rank, TERM rank, DIS INC rank, FA rank, and NTL rank. Product purchase ranks module 430 routes this highest rank as a next product purchase (NPP) rank to reports module 460, along with the associated product, and also routes these data to feature selection module 440 for use in feature selection.

Each of the regression models of predictive machine learning modeling module 400 is trained to select a subset of features to use in predictive modeling. In an embodiment, the subset of features comprise features with highest predictive value, while eliminating redundant features. Product-level features that contained information only after a product was purchased were removed to preserve predictive value. In an embodiment, Next Product Purchase predictive models were trained to include the following features: Customer SSN; Time period (customer year as part of the longitudinal purchase history structure); Major product type (e.g. Whole Life); Minor product type (e.g. Whole Life Legacy 65); Face amount; Benefit amount; Premium; Risk class; Riders. In an embodiment, certain features varied among the different predictive models 410-418 trained. Life policies included face amount and premium amount, whereas disability products included benefit and premium amount.

Feature selection module 440 selects a set of highest importance features from predictive features or variables processed by regression models of predictive modeling module 400. In an embodiment, feature selection module 440 selects a set of features of greatest importance in predicting the highest ranking product identified by product purchase ranks module 430. In the present disclosure, these greatest importance features are also called motivations, factors, or motivating factors.

Motivation interpretability module 450 automatically generates interpretability data for each of the motivations selected by module 440. Interpretability data helps users of the system, such as agents of the enterprise, to understand predictive modeling features (motivations) and to apply the motivations to pursue business objectives of the user agents. For example, this information can help an agent understand why a given customer received a high Next Product Purchase score.

In an embodiment, motivation interpretability module 450 includes a database of motivation interpretability data respectively associated with the selected subset of features used by module 400 in predictive modeling. In an embodiment, the database of motivation interpretability data contains a lookup table with one or more motivation interpretability data for each selected feature. The motivation interpretability data can be created or updated during training of the component regression models 410-450.

Figure 6:
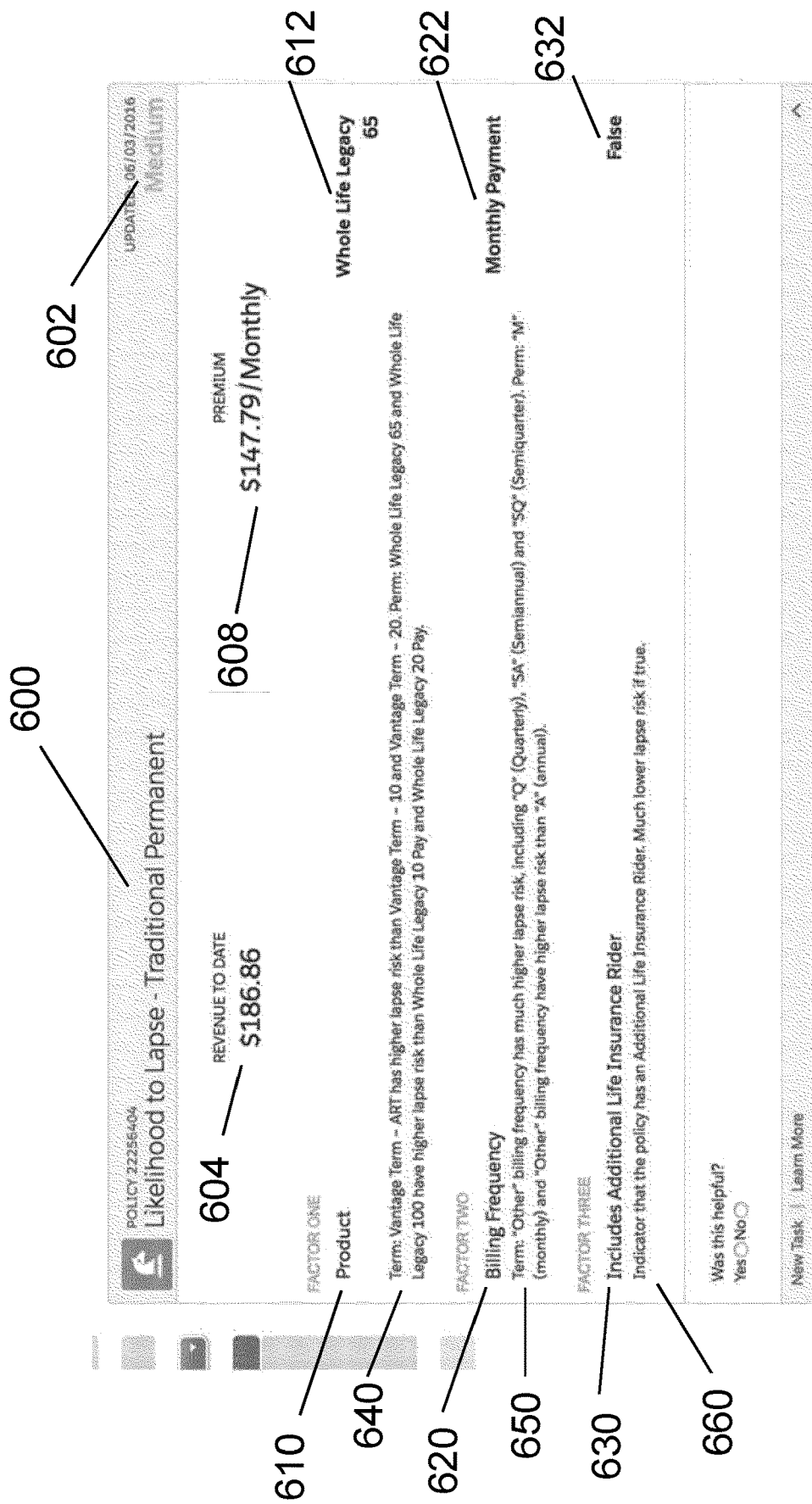
FIG. 6 is a representative view of a user interface of an agent's device, showing a dashboard displaying a lapse report.
Figure 7:
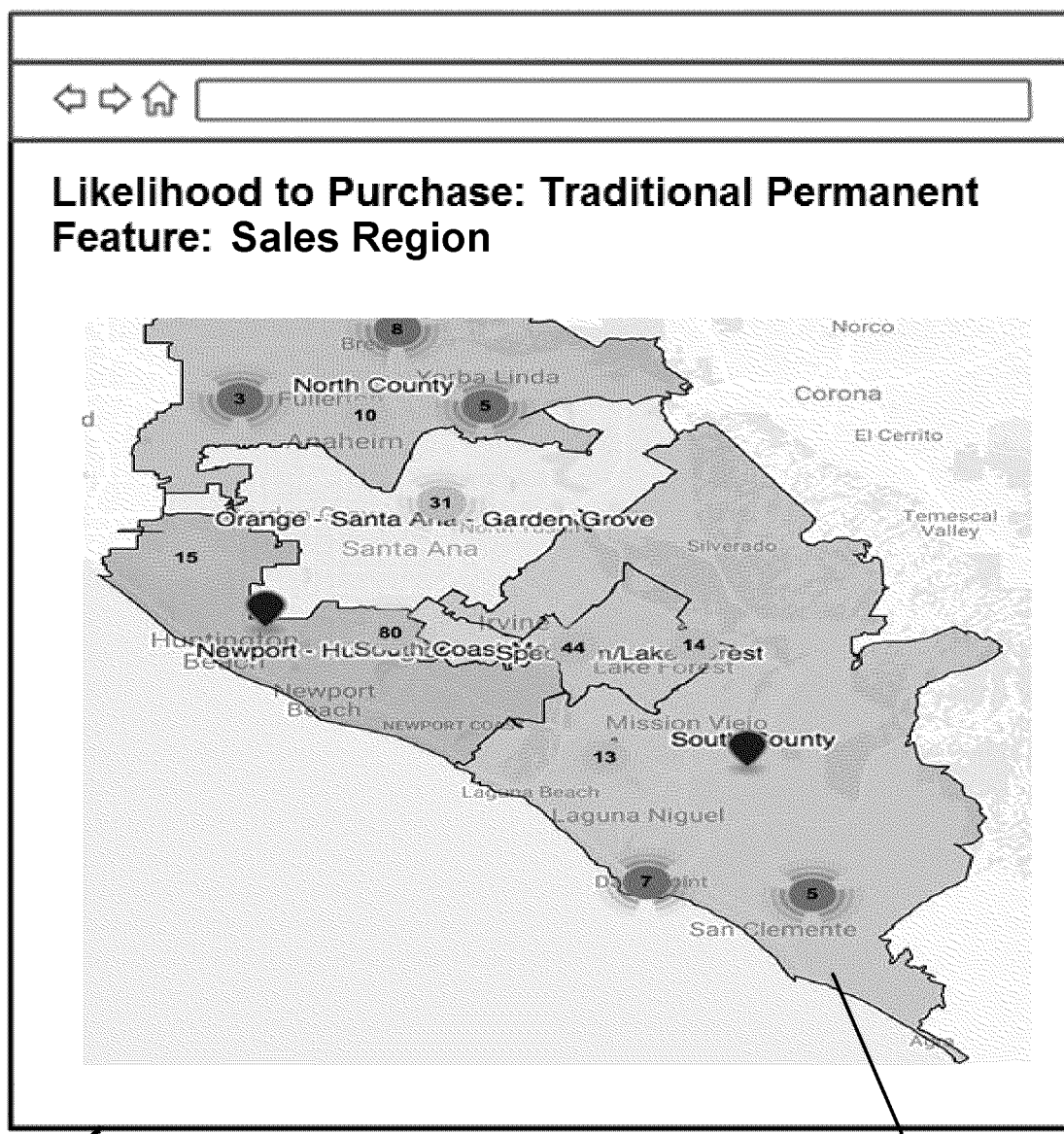
FIG. 7 is a representative view of a user interface of an agent's device, showing a dashboard displaying graphical visualization data relating to next product purchase (NPP).

Motivation interpretability data can include, for example, explanatory text data, such as text captions 640, 650, 660 in the likelihood to lapse dashboard 600 of FIG. 6; and graphical visualization data, such as the sales region map 720 displayed in the likelihood to purchase dashboard 700 of FIG. 7. Motivation interpretability data can be adapted to attributes of the features selected by module 440. Motivations can include general features for a priori segmentation such as cultural, demographic, geographic, and socioeconomic features. Additionally, motivations can include product-specific features.

In an embodiment, motivation interpretability module 450 can automatically generate different motivation interpretability data depending on context. Context can include business objective of a user agent. Examples of business objectives include closing sales to customers; identifying the most promising customers for cross selling (i.e., lead scoring); and training or professional development of an agent. NPP motivations and motivation interpretability data can help inexperienced agents learn basic customer profiles best suited to certain product families, and can offer experienced agents additional insights into customer behaviors to improve agents' ability to recommend products. Context also can distinguish motivation interpretability data generated for a single customer (e.g., the dashboard 600 of FIG. 6), versus data generated for a plurality of customers such as customers in the book of business of an agent or a population of customers of the enterprise (e.g., the dashboard 700 of FIG. 7).

Motivation interpretability module 450 routes the motivating factors identified by module 440, with the accompanying motivation interpretability data, to reports module 460 for display in a Next-to-Purchase report, such as a CRM dashboard.

In an embodiment, motivation data and motivation interpretability data are included in a predictive model for lapse, such as by adding feature selection and motivation interpretability modules corresponding to modules 440, 450 to the lapse predictive modeling pipeline of FIG. 3.

Figure 5:
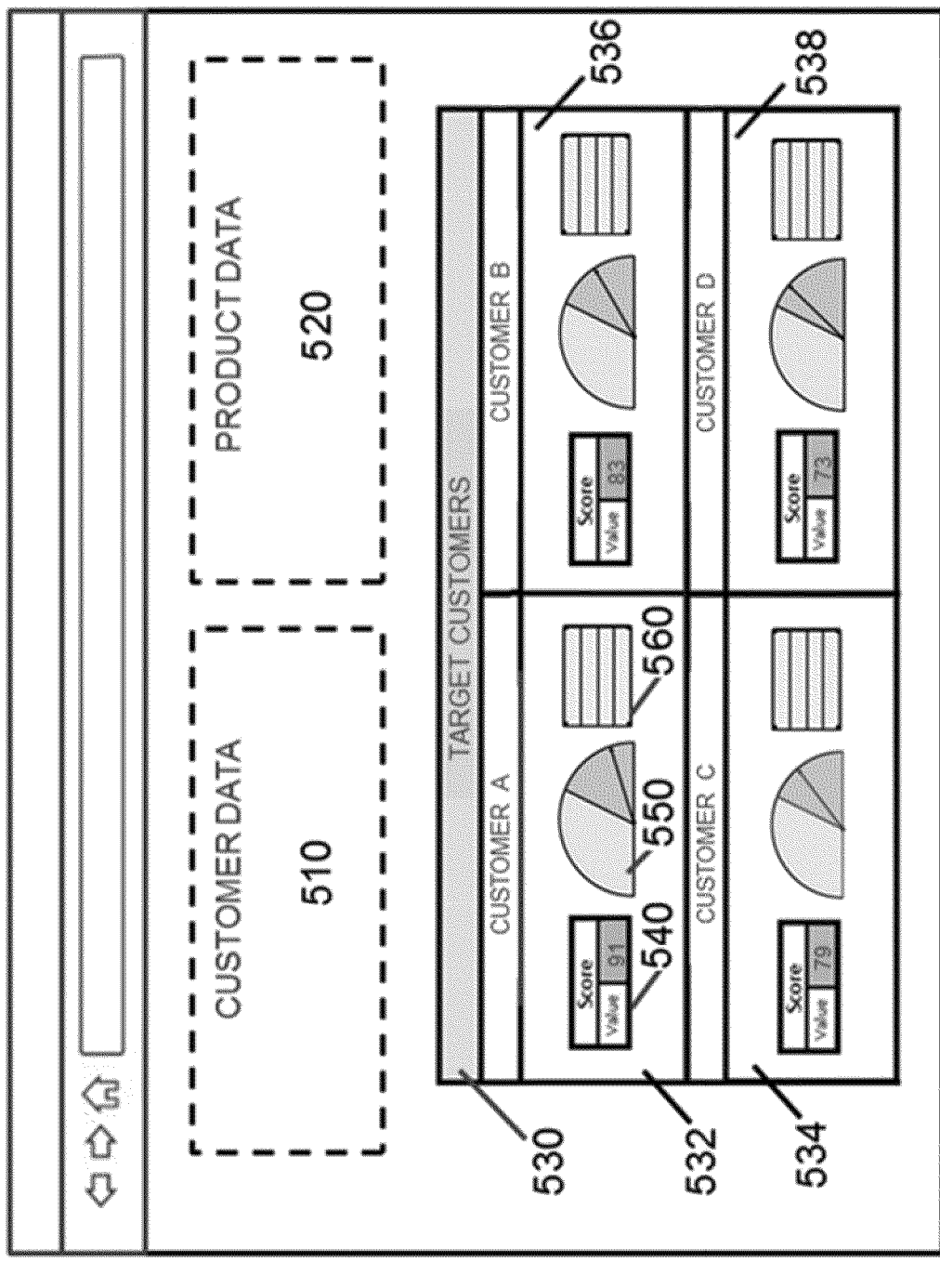
FIG. 5 is a representative view of a user interface of an agent's device, showing a dashboard displaying a next product purchase (NPP) report.

FIG. 5 shows in somewhat schematic form a dashboard 500 generated by CRM platform 160. Dashboard 500 displays on a user interface of an agent's device 570 a report of the customers in the target customer group generated by the next product purchases (NPP) predictive model. Besides information conventionally provided by CRM platform 160, dashboard 500 provides the agent with next product purchases (NPP) data to assist the agent in cross-selling recommended products to customers with high product purchase scores. User interface 500 includes customer data pane 450 providing information on a customer determined to have a high likelihood of cross-sale. Customer data pane 510 may include factors or motivations that were significant in determining a high product purchase score. Product data pane 520 displays information on a product of the enterprise that was determined to have the highest product purchase score among a set of product purchase scores generated for the customer. Displayed product data 520 may include factors that were significant in making that determination. In an embodiment, product data 520 pertains to an NPP product recommended for cross-sale different from one or more products previously purchased by the respective customer.

Window 530 of the customer service dashboard includes target customer panes 532, 534, 536 and 538, with graphics and information on various customers that were determined by the NPP predictive model to have high product purchase scores. In an embodiment, target customer panes 532, 534, 536 and 538 have information on four customers (Customers A, B, C, D) in the agent's book of business with highest product purchase scores determined by the NPP predictive model. Each pane includes a product purchase rank 540 for the respective customer, wherein each product purchase score represents a highest product purchase score among a set of product purchase scores generated for the customer. In an embodiment, product purchase scores 91, 83, 79, and 73 are above a threshold score 70 that is a classification criterion for classifying customers in the target customer group. A meter indicator icon 550 has a pointer position corresponding to each product purchase score. A listbox 560 can display significant features considered by the NPP predictive model in determining highest product purchase ranks. In an embodiment, these significant features are a set of highest importance features identified by the feature selection module 440 of the model pipeline of FIG. 4. In an embodiment, the agent selects one of the target customer panes 532, 534, 536 and 538 to display data for the associated customer at customer data pane 510 and product data pane 520. Customer relationship management dashboard data on high importance features, with underlying details, can provide useful insights to the agent in treatments of customers in the agent's book of business.

In another embodiment, the server initiates an ongoing communication session with a client device of a customer in the target customer group to display a graphical user interface (GUI) in presenting a favored product and motivating factors for the customer to purchase the favored product. The ongoing communication session can include email, chat, texting, over-the-top messaging, or others.

FIG. 6 shows another dashboard 600 generated by CRM platform 160. Dashboard 600 reports data on likelihood to lapse of payments for a Traditional Permanent policy owned by a given customer. Predictive modeling of likelihood to lapse for this customer resulted in a lapse rank 602 of Medium, ranking a lapse score of the customer in the Medium tier of distribution of lapse scores for a population of customers of the enterprise. Dashboard 600 displays three motivation factors: Factor One 610: Product; Factor Two 620: Billing Frequency; and Factor Three 630: Includes Additional Life Insurance Rider. Dashboard 600 displays motivation interpretability data 640, 650, 660 for each of respective motivation factors 610, 620, 630. These motivation interpretability data are generated as text captions. In addition, dashboard 600 displays customer financial data relevant to potential lapse, including total Revenue to Date 604 and monthly Premium 608.

FIG. 7 shows an NPP dashboard 700 generated by CRM platform 160. Dashboard 700 reports Likelihood to Purchase: Traditional Permanent data for a population of customers. The dashboard includes a map 720 that displays customer data by region, e.g., sales territories.

Figure 8:
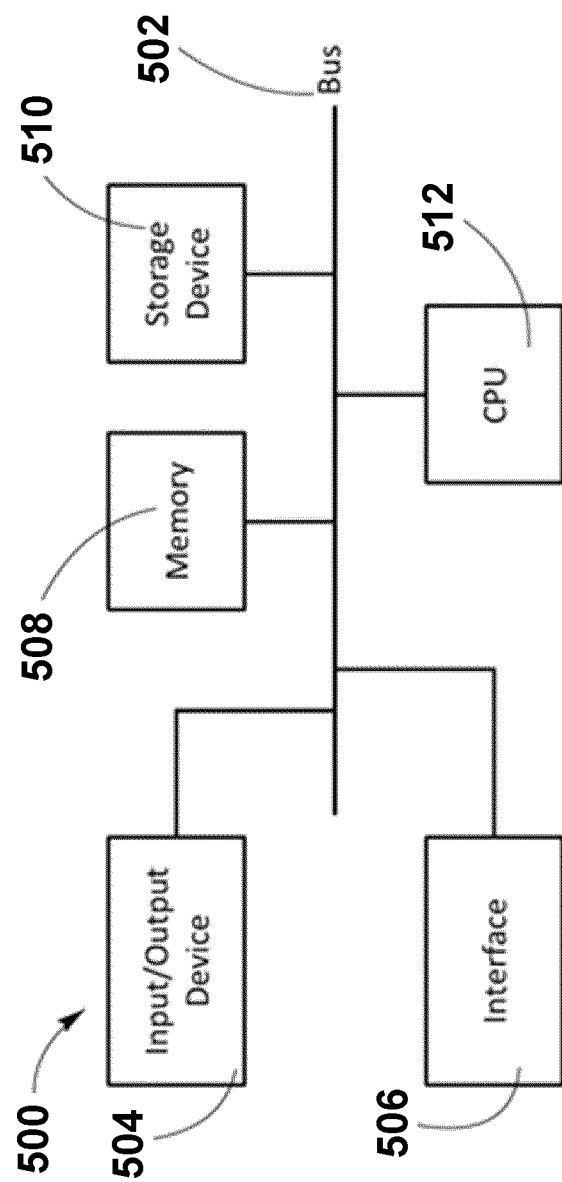
FIG. 8 is a block diagram illustrating an exemplary computing device in which one or more embodiments of the present disclosure may operate, according to an embodiment.

In the system schematic of FIG. 8, bus 802 is in physical communication with I/O device 804, communication interface 806, memory 808, storage device 810 and central processing unit 812. Bus 802 includes a path that permits components within computing device 800 to communicate with each other. Examples of I/O device 804 include peripherals and/or other mechanism that may enable a user to input information to computing device 800, including a keyboard, computer mice, buttons, touch screens, voice recognition, and biometric mechanisms and the like. I/O device 804 also includes a mechanism that outputs information to the user of computing device 800, such as a display, a light emitting diode (LED), a printer, a speaker, and the like.

Examples of communication interface 806 include mechanisms that enable computing device 800 to communicate with other computing devices and/or systems through network connections. Examples of network connections include any suitable connections between computers, such as, for example, intranets, local area networks (LANs), virtual private networks (VPNs), wide area networks (WANs), the Internet and the like. Examples of memory 808 include random access memory 808 (RAM), read-only memory (ROM), flash memory, and the like. Examples of storage device 810 include magnetic and/or optical recording medium, ferro-electric RAM (F-RAM) hard disks, solid-state drives, floppy disks, optical discs and the like. In one embodiment, memory 808 and storage device 810 store information and instructions for execution by central processing unit 812. In another embodiment, central processing unit 812 includes a microprocessor, an application specific integrated circuit (ASIC), or a field programmable object array (FPOA) and the like. In this embodiment, central processing unit 812 interprets and executes instructions retrieved from memory 808 and storage device 810.

Figure 9:
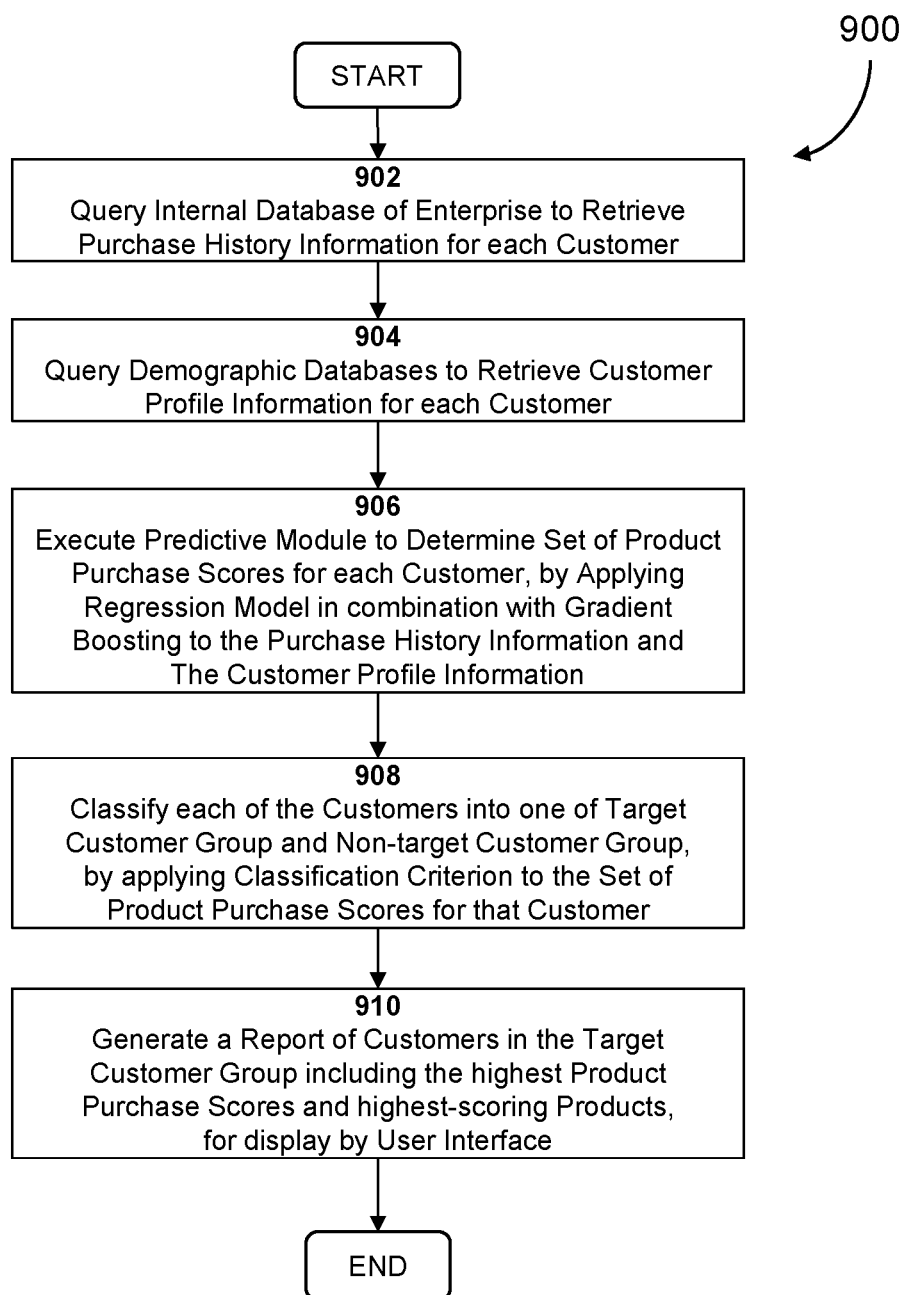
FIG. 9 is a flow chart diagram of a method for predicting and reporting customers with greatest likelihood of next product purchase (NPP) and/or lapse behaviors.

The flow chart diagram of FIG. 9 shows a processor-based method 900 for tracking persons across events between the customer groups for predicting and reporting customers with greatest likelihood of next product purchase (NPP) and/or lapse behaviors. At step 902, a processor queries an internal customer purchase history database of an enterprise comprising purchase history information to retrieve the purchase history information for each of a plurality of customers of an enterprise. The purchase history information comprises information on previous purchase by each customer of one or more products from a set of products of the enterprise. In an embodiment, the purchase history information is organized longitudinally by customer-year. In an embodiment, the purchase history information includes information on customer's first purchase and date of first purchase, and information on new and cumulative purchases during each customer-year following date of first purchase.

At step 904, the processor queries one or more customer demographic databases to retrieve customer profile information corresponding to each of the plurality of customers of the enterprise. In an embodiment, the processor retrieves information from an internal customer profile database of the enterprise, and from an external demographic database. In an embodiment, the retrieved data is stored in a current customer profile database. In an embodiment, the processor further queries an internal payment database of the enterprise to retrieve information on history of payments by each customer for the one or products previously purchased by the respective customer.

At step 906, the processor executes a predictive model to determine a set of product purchase scores for each customer. The predictive model applies a regression model in combination with gradient boosting to the purchase history information and the customer profile information. In an embodiment, respective product purchase scores within the set of product purchase score are representative of likelihood that the respective customer will accept a respective product from the set of products of the enterprise. In some embodiments of step 906, the respective product purchase scores exclude products previously purchased by the customer.

In an embodiment of step 906, the predictive model comprises a plurality of component predictive models, each of which is configured to target likelihood of purchasing one of the respective products from the set of products of the enterprise. Each of the plurality of component predictive models determines a respective product purchase score of the set of product purchase scores.

In some embodiments of step 906, the predictive model is further configured to determine, for each of the plurality of customers, a lapse score representative of a likelihood that the respective customer will lapse in payment for the one or more products previously purchased by the customer.

At step 908, the processor classifies each of the plurality of customers into one of a target customer group and a non-target customer group. This classification step applies a classification criterion to a highest product purchase score of the set of product purchase scores determined for the respective customer. In an embodiment of step 908, the classification criterion compares size of the respective customer's highest product purchase score to a threshold. In another embodiment of step 908, the classification criterion compares rank of the respective customer to a given number of customers in the target customer group, wherein the rank of each customer is determined by the size of the respective customer's highest product purchase score.

In embodiments in which the predictive model additionally determines a lapse score for each of the customers, step 908 further classifies each of the customers into one of a target retention group with highest values of lapse scores, and a non-target retention group.

At step 910, the processor updates a graphical user interface (GUI) of the customers in the target customer group for display by a user interface. In an embodiment, the GUI displays a report including the highest product purchase scores and the products having the highest product purchase scores, for display by a user interface in operative communication with the processor.

In an embodiment of step 910, the processor is a server computer, and the GUI is presented to an agent of the enterprise by a user interface of client device by displaying a customer relationship management (CRM) dashboard. In an embodiment of step 910, the processor generates a report of customers in a book of business of an agent of the enterprise, including recommended products for customers in the agent's book of business that have the highest predicted likelihood of cross-sale.

In an embodiment of step 910, the processor is a server computer, which initiates an ongoing communication session with a client device of a customer in the target customer group. In an embodiment, the communication session is preset in advance, such as via querying a local or remote data source or a user of the client, or heuristically. For example, a network address, such as a phone number or screen name, can be preset by the user of a PIM application or be availed via the server, including a chatbot application. The ongoing communication session can include email, chat, texting, over-the-top messaging, or others.

In an embodiment of step 910, the processor sends an email (e.g., to agents of the enterprise) with a hyperlink to a listing of the target group with NPP information for a favored product. This information can be used by agents of the enterprise in planning a marketing campaign for the favored product. In an embodiment, the processor sends NPP information on a favored product to a particular agent of the enterprise, e.g., based on that agent's expertise in the favored product.

In embodiments in which the predictive model additionally determines a lapse score for each of the customers, step 910 further generates a report of the customers in the target retention group including the highest lapse scores. In an embodiment, the report of the customers in the target retention group with the highest lapse scores, further comprises modeled lifetime values of these customers based upon customer retention assumptions.

In an embodiment, NPP predictive models were developed over multiple iterations using training datasets and performance testing. In an exemplary embodiment, training data instances were composed of 3.1 million years of purchase history data over a six-year period, for a population of 787,000 customers. In an embodiment, the training data included cross-sales of 0.0689 cross-sales per customer. In an embodiment, during development of predictive models, performance was evaluated by referring to the area under the curve (AUC) for all resultant Receiver Operating Curves (ROC). In various embodiments, the predictive models are periodically retrained to deliver scores for a current customer base of the enterprise.

In an embodiment, a procedure for building NPP predictive models utilized market basket analysis machine learning to train logistic regression models (e.g., regression models 210-250, FIG. 2). This training procedure performed market basket analysis mining of purchase history data in customer purchase history database 120 to generate a plurality of association rules. These association rules correlated previously purchased products from the set of products of the enterprise with a current purchase of an additional product of the enterprise. Each association rule included an itemset of one or more previously purchased products and an itemset of the current purchase of the additional product of the enterprise.

Traditional machine learning via market value analysis looks at the customers who are most likely to purchase a given product based on their most current data, and analyzes what customers, overall, are the best candidates for a given product. The predictive machine learning modeling technique of the present disclosure analyzes what customers are ready to be sold a product of the enterprise by analyzing customer purchase history data. The customer purchase history database tracks, for each customer of the enterprise, the initial product purchased and date of first purchase, and new and cumulative purchases of products of the enterprise during customer-years commencing from anniversaries of the customer's date of first purchase. In an embodiment, market basket analysis mining of the customer purchase history database treated each individual customer year as a negative label within training data and treated each sale year as a positive label within training data. This predictive modeling technique predicts likelihood to purchase based on a customer's most current data, but because the predictive model is trained on customer years, the model generates a prediction whether the customer is likely to engage in a cross-sale in the coming customer year.

Table 4 illustrates a simple run of association rules of an exemplary market basket analysis. The market value analysis extracted data from enterprise database 110 by selecting all individual customers based on SSN, examining product data within ten major product groups. The market value analysis organized data into one observation per customer, and one variable for each product. Association rules include an antecedent itemset of one or more previously purchased products of the enterprise (lhs), and a subsequent or covariate itemset of a current purchase of an additional product of the enterprise (rhs). The market value analysis created a binary indicator for each product as covariate.

TABLE 4

ASSOCIATION RULES

| lhs | | rhs | support | confidence | lift |
|---|---|---|---|---|---|
| (PERM_SEC_BRKG) | => | (MUTLFUND) | 0.000110041 | 0.824104235 | 4.793011925 |
| (BOE, TRAD) | => | (DIS_INC) | 0.000170063 | 0.833688699 | 4.4818721 |
| (BOE, NTL) | => | (DIS_INC) | 0.000359699 | 0.819623389 | 4.406257641 |
| (BOE,TERM) | => | (DIS_INC) | 0.000521063 | 0.82111035 | 4.41425147 |
| (BOE, MUTLFUND) | => | (DIS_INC) | 0.000280974 | 0.833548387 | 4.481117788 |
| (BOE, PERM) | => | (DIS_INC) | 0.000640673 | 0.830326945 | 4.463799462 |
| (BOE,NTLPERM) | => | (DIS_INC) | 0.00015571 | 0.875305623 | 4.70560277 |
| (BOE,MUTLFUND,TERM) | => | (DIS_INC) | 0.000120915 | 0.876971609 | 4.71455903 |
| (BOE,PERM,TERM) | => | (DIS_INC) | 0.000242699 | 0.869158879 | 4.672558151 |
| (BOE,MUTLFUND,PERM) | => | (DIS_INC) | 0.000164844 | 0.883449883 | 4.749385937 |
| (GRP_NTLMUTLFUND,TRAD) | => | (PERM) | 0.00011439 | 0.842948718 | 2.461696091 |
| (GRP_NTLNTLTERM) | => | (PERM) | 0.00012048 | 0.860248447 | 2.512217166 |
| (GRP_NTLMUTLFUND,NTL) | => | (PERM) | 0.000144836 | 0.840909091 | 2.455739688 |
| (GRP_NTL,MUTLFUND,TERM) | => | (PERM) | 0.000215297 | 0.874558304 | 2.5540068 |
| (DIS_INC.GRP_NTLMUTLFUND,NTL) | => | (PERM) | 0.000110911 | 0.888501742 | 2.594726368 |
| (DIS_INC.GRP_NTLMUTLFUND.TERM) | => | (PERM) | 0.000163104 | 0.892857143 | 2.607445615 |

In an embodiment, in market basket analysis data mining various constraints were applied to association rules to select rules of particular significance and interest. The market value analysis used threshold values of support and confidence to select association rules of particular interest. The support of a rule is the frequency of occurrence of the rule in the set of all transactions. In an embodiment, calculated association rules were selected for inclusion in the predictive model during training of the logistic regression model based on support thresholds representing a minimum frequency within a plurality of purchase history transactions in the customer purchase history database.

The confidence of a rule "A=>B" is the probability that if a basket contains A it will also contain B. In an embodiment, calculated association rules were selected for inclusion in the predictive model during the previous training of the logistic regression model based on confidence thresholds defining a minimum number of transactions in the customer purchase history database in which the antecedent itemset of the one or more of the previously purchased products appears.

The lift of the rule "A=>B" is a measure of the predictive power of the premise A. Lift is a multiplier for the probability of B in the presence of A versus the probability of B without any prior knowledge of other items in the market basket.

In an embodiment, NPP predictive models undergo performance testing using various performance metrics such as the area under the Receiver Operating Characteristic (ROC) curve, known as AUC, and lift. In an example, predictive models were able to distinguish between customer-years in which customers convert to a cross-sale and those in which they do not. The predictive models achieved AUC values of 0.758 and higher for all product types. Logistic regression models included in an ensemble of component predictive models generated NPP predictions for different major product types having a mean AUC of 0.894, indicating high performing models.

Figure 10:
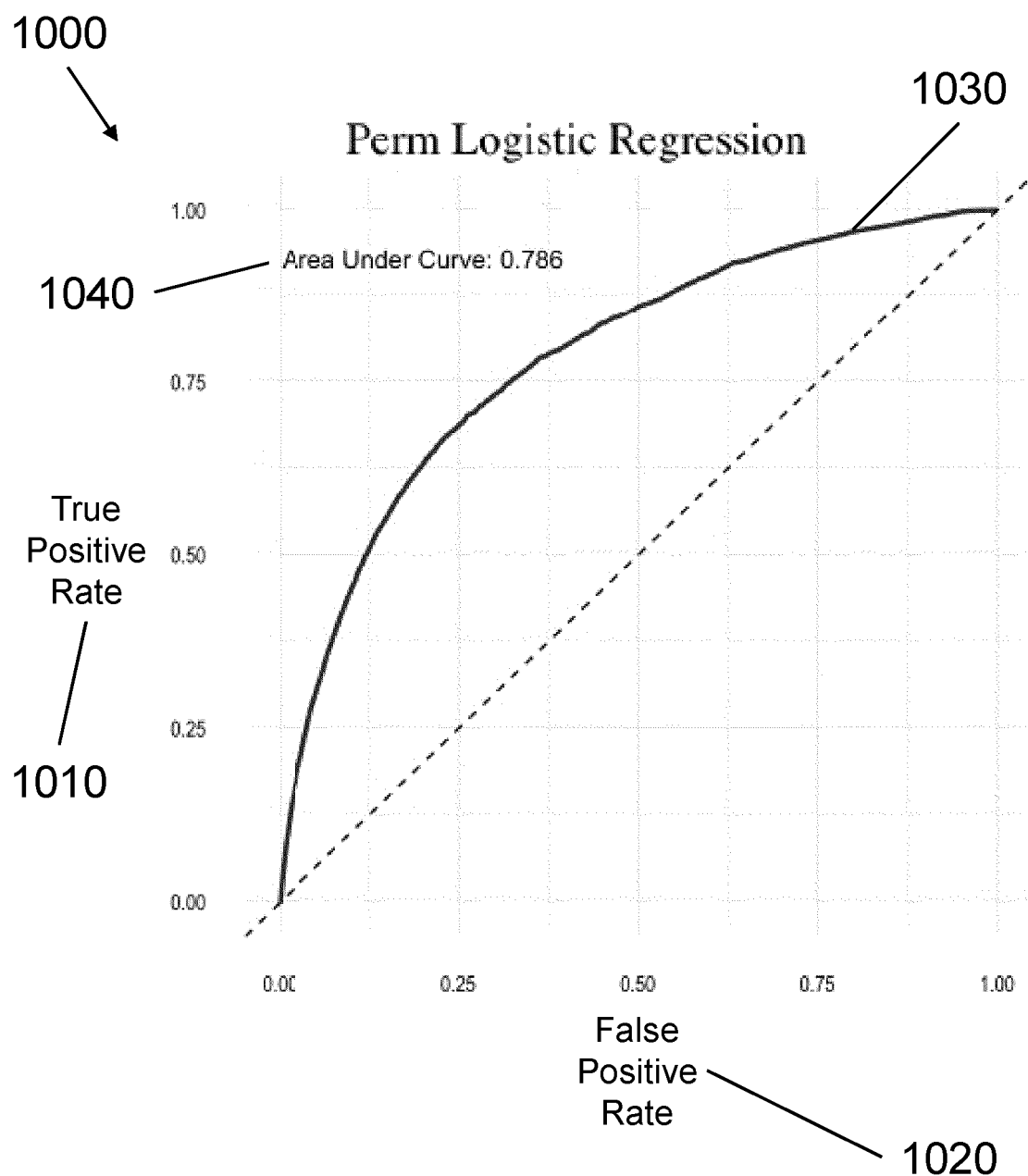
FIG. 10 is a graph of a receiver operator curve (ROC) for a logistic regression model for predicting likelihood of cross-sale of the product group PERM, according to an embodiment.

FIG. 10 is an example of an ROC curve for a product family, PERM, quantifying predictive capacity of logistic regression as a tradeoff between true positive rate and a corresponding false positive rate. The receiver-operating characteristic (ROC) curve plots the true positive rate (Sensitivity) 1010 as a function of the false positive rate (100-Specificity) 1020 for different cut-off points. Each point on the ROC curve 1030 represents a sensitivity/specificity pair corresponding to a particular decision threshold. An ROC curve with a higher area under the curve (AUC) generally indicates a higher-performing model. The ROC 1000 of FIG. 10 was obtained in testing an NPP logistic regression model for the product family PERM, and has an area under the curve (AUC) 1040 of 0.786, indicating a high-performing model.

Figure 11:
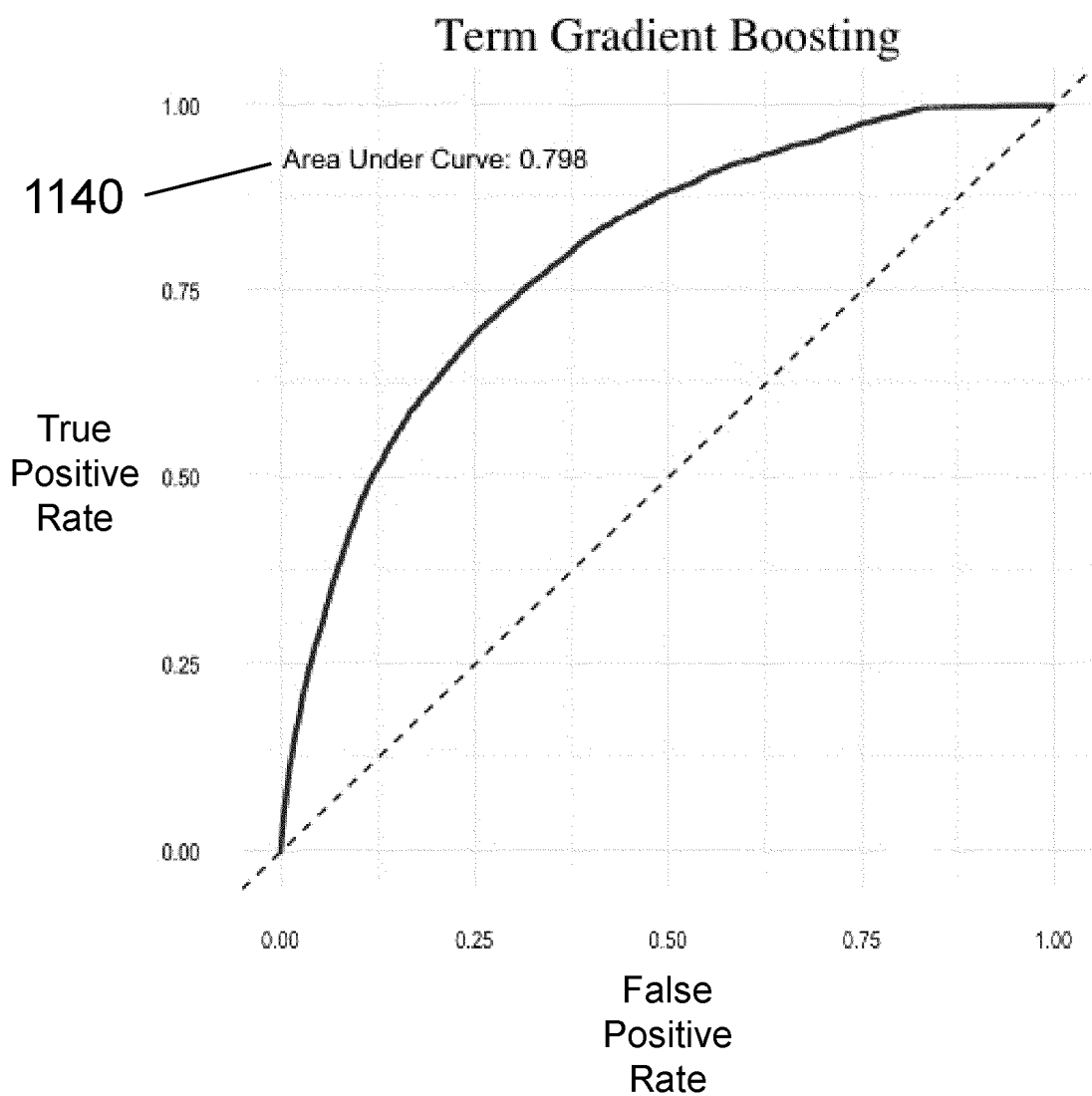
FIG. 11 is a graph of a receiver operator curve (ROC) for a gradient boosting model for predicting likelihood of cross-sale of the product group TERM, according to an embodiment.

FIG. 11 is an example of an ROC curve quantifying predictive capacity of gradient boosting. The ROC of FIG. 11 was obtained in testing an NPP gradient boosting model for the product family TERM, and has an area under the curve (AUC) 1140 of 0.798, indicating a high-performing model.

Examples: In an exemplary embodiment, an NPP predictive model, including a logistic regression model utilizing gradient boosting, was trained against a target of TERM life insurance for a population of existing product owners of Massachusetts Mutual Life Insurance Company, Springfield Mass. (MassMutual). A first customer highly scored by the TERM model was a 30 year old male, who had owned MassMutual product(s) for two customer-years, and currently owned PERM (permanent life insurance) and DIS INC (disability income) products. Features of the PERM product owned by the first customer were: Risk Class: Premium Ultra; Face Amount: 300K; Waiver of Premium Rider. Features of the DIS INC product owned by the first customer were Job Code: 3A; Benefit: 500; Premium: $200.91.

A second customer highly scored by the TERM model was a 30 year old male, who had owned MassMutual product(s) for six customer-years, and currently owned PERM (permanent life insurance), DIS INC (disability income), and Mutual Fund products. Features of the PERM product owned by the second customer were: Product Name: Whole Life Legacy 100; Risk Class: SPNT (Super Preferred Non-Tobacco); Face Amount: 111K; Waiver of Premium Rider. Features of the DIS INC product owned by the second customer were Job Code: 2A; Benefit: 500; Premium: $206.15.

In an exemplary embodiment, an NPP predictive model, including a logistic regression model utilizing gradient boosting, was trained against a target of DIS INC life insurance for a population of existing MassMutual product owners. A third customer highly scored by the DIS INC model was a 25 year old female, who had owned MassMutual product(s) for six customer-years, and currently owned PERM (permanent life insurance), TERM (term life insurance), and Brokerage products. Features of the PERM product owned by the third customer were: Product Name: Whole Life Legacy 20 Pay; Risk Class: SPNT (Super Preferred Non-Tobacco); Face Amount: 555K; Waiver of Premium Rider. Features of the TERM product owned by the third customer were Product Name: Vantage Term—ART; Risk Class: UP (Ultra Premium); Face Amount: 350K; Premium: $188; Waiver of Premium Rider.

A fourth customer highly scored by the DIS INC model was a 23 year old male, who had owned MassMutual product(s) for two customer-years, and currently owned PERM (permanent life insurance), TERM (term life insurance), and Mutual Fund products. Features of the PERM product owned by the fourth customer were: Product Name: Whole Life Legacy 20 Pay; Risk Class: SPNT (Super Preferred Non-Tobacco); Face Amount: 250K; Waiver of Premium Rider. Features of the TERM product owned by the fourth customer were Product Name: Vantage Term—20; Risk Class: UP (Ultra Premium); Face Amount: 750K; Premium: $485; Waiver of Premium Rider.

The foregoing method descriptions and the interface configuration are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class or any combination of instructions, data structures or program statements. A code segment may be coupled to another code segment or a hardware circuit by passing and/or receiving information, data, arguments, parameters or memory contents. Information, arguments, parameters, data, etc., may be passed, forwarded or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory, computer-readable or processor-readable storage medium. The steps of a method or algorithm disclosed here may be embodied in a processor-executable software module which may reside on a computer-readable or processor-readable storage medium. A non-transitory, computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A processor-based method, comprising:
executing, by a processor, a predictive machine learning model configured to determine, for each customer record of a plurality of customer records including customer profile data stored in a customer database, a set of product purchase ranks by inputting historical customer purchase data and the customer profile data into a logistic regression model to continuously train the predictive machine learning model to generate association rules correlating previously purchased products from a set of products of an enterprise with a potential purchase,
wherein the historical customer purchase data for each customer tracks an initial product purchased, date of initial product purchase, and any additional purchase of a product during recurring time periods following the customer's date of initial product purchase, wherein the continuous training of the logistic regression model treats each recurring time period as a label within training data;

inputting, by the processor into the predictive machine learning model, a selected customer profile to predict a highest likelihood potential purchase;

while the processor is associated with an ongoing communication session with a customer device, generating, by the processor, for display by a user interface in operative communication with the processor, content comprising an indicator for the highest likelihood potential purchase.

2. The processor-based method of claim 1, wherein each of the association rules comprises an antecedent itemset of one or more of the previously purchased products from the set of products of the enterprise, and a subsequent itemset of the current purchase of the additional product of the enterprise.

3. The processor-based method of claim 2, wherein particular association rules of the generated association rules were selected for inclusion in the predictive machine learning model during the continuous training of the predictive machine learning model based on support thresholds representing a minimum frequency within a plurality of purchase history transactions in a customer purchase history database.

4. The processor-based method of claim 2, wherein particular association rules of the generated association rules are selected for inclusion in the predictive machine learning model during the continuous training of the predictive machine learning model based on confidence thresholds defining a minimum number of transactions in a customer purchase history database in which the antecedent itemset of the one or more of the previously purchased products appears.

5. The processor-based method of claim 1, wherein the recurring time periods following the customer's date of initial product purchase comprise customer-years commencing from anniversaries of the customer's date of initial product purchase.

6. The processor-based method of claim 5, wherein the continuous training of the logistic regression model generates the association rules by market basket analysis mining treating each individual customer year as a negative label within training data and treating each customer year including a new sale as a positive label within training data.

7. The processor-based method of claim 1, wherein the continuous training of the logistic regression model generates the association rules by market basket analysis mining that organized data into one observation per customer, and one variable for each product.

8. The processor-based method of claim 1, wherein each of the set of product purchase ranks comprises a tier corresponding to a product purchase score, selected from a plurality of tiers based upon a distribution of product purchase scores for the plurality of customers of the enterprise.

9. The processor-based method of claim 1, wherein each of the set of product purchase ranks comprises a percentile classification of a product purchase score relative to product purchase scores for the plurality of customers of the enterprise.

10. The processor-based method of claim 1, wherein the predictive machine learning model applies the logistic regression model using gradient boosting to the historical customer purchase data and the customer profile data.

11. The processor-based method of claim 1, wherein the predictive machine learning model comprises a plurality of component predictive models, wherein each of the component predictive models targets likelihood of purchasing a respective product from a set of products of the enterprise, wherein each of the plurality of component predictive models determines a respective one of the set of product purchase ranks, and wherein each of the plurality of component predictive models is separately continuously trained to generate association rules correlating previously purchased products with a potential purchase.

12. The processor-based method of claim 1, wherein the predictive machine learning model is further configured to determine a lapse rank for each of the plurality of customer records by inputting information on history of payments into the logistic regression model.

13. The processor-based method of claim 12, wherein the processor is further configured to generate, for display by the user interface in operative communication with the processor, content representative of modeled lifetime values based upon customer retention assumptions.

14. A system, comprising:

non-transitory machine-readable memory that stores plurality of customer records including customer profile data for customers of an enterprise and historical customer purchase data for the plurality of customers of the enterprise, said historical customer purchase data comprising information on previous purchase by each customer of one or more products from a set of products of the enterprise, wherein the historical customer purchase data for each customer tracks an initial product purchased, date of initial product purchase, and any additional purchase of a product during recurring time periods following the customer's date of initial product purchased;

a predictive modeling module that stores a predictive machine learning model configured to determine, for each of one or more customer records, a set of product purchase ranks by applying a logistic regression model to continuously train the predictive machine learning model to generate association rules correlating previously purchased products from the set of products of the enterprise with a potential purchase, wherein the continuous training of the logistic regression model treats each recurring time period as a label within training data; and a processor, configured to execute a customer targeting module, wherein the processor in communication with the non-transitory, machine-readable memory and the predictive modeling module executes a set of instructions instructing the processor to:

for each of the plurality of customers of the enterprise, determine the at least one product purchase rank by inputting the customer purchase history information and the customer profile data into the predictive machine learning model; and while the processor is associated with an ongoing communication session with a customer device, automatically generate for display by a user interface in operative communication with the processor, content comprising an indicator for the highest likelihood potential purchase.

15. The system according to claim 14, wherein the processor is a server computer, the user interface is included in a client device, and the content comprising an indicator for the highest likelihood potential purchase is displayed to an agent of the enterprise by the user interface of the client device.

16. The system according to claim 14, further comprising a customer relationship management (CRM) platform, wherein the content comprising an indicator for the highest likelihood potential purchase is displayed to the agent of the enterprise via a dashboard of the customer relationship management (CRM) platform.

17. The system according to claim 14, wherein each of the generated association rules comprises an antecedent itemset of one or more of the previously purchased products from the set of products of the enterprise, and a subsequent itemset of the current purchase of an additional product of the enterprise.

18. The system according to claim 14, wherein particular association rules of the generated association rules are selected for inclusion in the predictive machine learning model during the continuous training of the predictive machine learning model based on confidence thresholds defining a minimum number of transactions in a customer purchase history database in which the antecedent itemset of the one or more of the previously purchased products appears.

19. The system according to claim 14, wherein particular association rules of the generated association rules are selected for inclusion in the predictive machine learning model during the continuous training of the predictive machine learning model based on confidence thresholds defining a minimum number of transactions in a customer purchase history database in which the antecedent itemset of the one or more of the previously purchased products appears.

20. The processor-based method of claim 1, wherein the continuous training of the logistic regression model generates the association rules by market basket analysis mining treating each recurring time period as a negative label within training data and treating each recurring time period including a new sale as a positive label within training data.

\* \* \* \* \*